(12) United States Patent
Burgess et al.

(10) Patent No.: US 11,213,900 B2
(45) Date of Patent: Jan. 4, 2022

(54) QUICK-RELEASE COUPLING FOR DRILLING AND RELATED METHODS

(71) Applicant: J.H. FLETCHER & CO., Huntington, WV (US)

(72) Inventors: Timothy D. Burgess, South Point, OH (US); William Andrew Burgess, Jr., Huntington, WV (US); Lyle Abraham Crum, Huntington, WV (US); Douglas Bise, Huntington, WV (US)

(73) Assignee: J.H. FLETCHER & CO., Huntington, WV (US)

( * ) Notice: Subject to any disclaimer, the term of this patent is extended or adjusted under 35 U.S.C. 154(b) by 0 days.

(21) Appl. No.: 16/636,045

(22) PCT Filed: Feb. 4, 2019

(86) PCT No.: PCT/US2019/016514
§ 371 (c)(1),
(2) Date: Feb. 3, 2020

(87) PCT Pub. No.: WO2019/152928
PCT Pub. Date: Aug. 8, 2019

(65) Prior Publication Data
US 2021/0001412 A1    Jan. 7, 2021

Related U.S. Application Data

(60) Provisional application No. 62/625,605, filed on Feb. 2, 2018, provisional application No. 62/743,196, filed on Oct. 9, 2018.

(51) Int. Cl.
*B23B 51/12* (2006.01)
*B23B 31/113* (2006.01)
(Continued)

(52) U.S. Cl.
CPC .......... *B23B 51/126* (2013.01); *B23B 31/113* (2013.01); *B23B 2231/04* (2013.01);
(Continued)

(58) Field of Classification Search
CPC . B23B 31/113; B23B 51/126; B23B 2231/04; B25B 23/0035; E21B 17/02;
(Continued)

(56) References Cited

U.S. PATENT DOCUMENTS 986,829 A * 3/1911 Kasperson ............ B23B 51/123
279/103
1,256,222 A * 2/1918 Grabill ................... B23B 51/123
279/103
(Continued)

FOREIGN PATENT DOCUMENTS

WO    WO-8600247 A1 * 1/1986    ......... B23B 31/1173
ZA    9107920 A * 12/1992

*Primary Examiner* — Eric A. Gates
(74) *Attorney, Agent, or Firm* — Dickinson Wright PLLC; Andrew D. Dorisio

(57) ABSTRACT

An apparatus in the form of an adapter for forming a connection comprising a first part adapted for coupling with a second part by a quick-release coupling formed by a first projection of the first part having an at least partial dovetail shape and a recess of the second part having an at least partial dovetail shape. An opening in the recess is adapted for receiving the projection in an axial direction. In other embodiments, the adapter is: (1) frictionally enhanced for engaging an internal portion of the drilling element; (2) includes a radial projection elongated in an axial direction for engaging the internal portion of the one drilling element; and/or (3) has a cutter for scoring an internal portion of the one drilling element upon being inserted therein and rotated. An adapter is also disclosed for use with a drill chuck, including for creating a "twist lock" connection.

14 Claims, 24 Drawing Sheets

(51) Int. Cl.
*E21B 17/03* (2006.01)
*E21B 17/02* (2006.01)

(52) U.S. Cl.
CPC ........... *B23B 2231/24* (2013.01); *E21B 17/02* (2013.01); *E21B 17/03* (2013.01); *Y10T 279/17111* (2015.01); *Y10T 279/17863* (2015.01); *Y10T 279/3406* (2015.01); *Y10T 408/957* (2015.01)

(58) Field of Classification Search
CPC ............. E21B 17/03; Y10T 279/17008; Y10T 279/3406; Y10T 279/3412; Y10T 279/3418
See application file for complete search history.

(56) References Cited

U.S. PATENT DOCUMENTS

| | | | | |
|---|---|---|---|---|
| 2,257,418 | A | 9/1941 | Gustave | |
| 2,399,536 | A * | 4/1946 | Baum | B23P 19/00 29/256 |
| 2,515,366 | A | 7/1950 | Zublin | |
| 2,684,839 | A * | 7/1954 | Rice | B23B 31/18 173/126 |
| 2,722,494 | A | 11/1955 | Zublin | |
| 3,153,856 | A * | 10/1964 | Felix | F41G 11/002 42/127 |
| 3,171,226 | A * | 3/1965 | Into | F41G 1/425 42/76.01 |
| 3,193,932 | A * | 7/1965 | Johnson | F41G 1/02 42/148 |
| 3,411,796 | A * | 11/1968 | Decker | B23B 31/202 279/46.4 |
| 3,734,515 | A * | 5/1973 | Dudek | B25B 23/0035 279/144 |
| 4,006,787 | A * | 2/1977 | Rumpp | E21B 17/03 173/132 |
| 4,226,290 | A | 10/1980 | McSweeney | |
| 4,334,336 | A * | 6/1982 | Harbeck | A47L 11/34 15/322 |
| 4,417,729 | A * | 11/1983 | Morrone | A63B 51/14 473/556 |
| 4,454,922 | A * | 6/1984 | Jamison | E21B 17/03 175/320 |
| 4,472,163 | A * | 9/1984 | Bottini | B62M 9/10 192/64 |
| 4,632,195 | A * | 12/1986 | Emmerich | E21B 17/046 175/320 |
| 4,779,370 | A * | 10/1988 | Cormack | F41A 21/48 42/124 |
| 4,834,594 | A * | 5/1989 | Morgan | E21B 3/02 175/320 |
| 5,257,557 | A * | 11/1993 | Battten | B23B 31/113 279/93 |
| 5,325,931 | A | 7/1994 | Woods | |
| 6,170,570 | B1 * | 1/2001 | Aguesse | E21B 17/02 166/65.1 |
| 6,276,879 | B1 * | 8/2001 | Hecht | B23C 5/1054 409/234 |
| 6,318,015 | B1 * | 11/2001 | Baumann | F41G 1/033 42/111 |
| 6,367,567 | B1 * | 4/2002 | Massa | E21B 17/00 175/323 |
| 6,623,220 | B2 * | 9/2003 | Nuss | B23B 31/1071 279/75 |
| 6,648,071 | B2 * | 11/2003 | Hackworth | E21B 17/00 166/207 |
| 6,851,214 | B2 * | 2/2005 | Oz | F41G 1/35 42/111 |
| 7,036,401 | B2 * | 5/2006 | Carroll | B25B 13/06 81/124.4 |
| 7,101,127 | B2 * | 9/2006 | Kimura | B23B 31/06 408/239 A |
| 7,207,400 | B2 * | 4/2007 | Bise | E21B 17/03 175/320 |
| 7,325,631 | B2 | 2/2008 | Roberts et al. | |
| 7,331,738 | B2 * | 2/2008 | Hofbrucker | B25B 21/007 279/145 |
| 7,334,970 | B2 * | 2/2008 | Kozak | B23B 31/005 279/137 |
| 7,549,953 | B2 * | 6/2009 | Walters | B23B 31/20 279/143 |
| 8,220,135 | B2 * | 7/2012 | Vogel | B25B 15/001 29/566.4 |
| 8,376,669 | B2 * | 2/2013 | Jaeger | B23B 31/113 408/231 |
| 9,004,827 | B2 * | 4/2015 | Meyer | B23B 51/048 408/224 |
| 9,193,045 | B2 * | 11/2015 | Saur | B25B 21/00 |
| 9,468,977 | B2 * | 10/2016 | McCormick | B23B 31/1075 |
| 9,883,853 | B2 * | 2/2018 | Woodard | B23B 31/103 |
| 2005/0098001 | A1 * | 5/2005 | Walker | B25B 13/06 81/439 |
| 2007/0098935 | A1 * | 5/2007 | Farran | B29C 33/48 428/35.7 |
| 2007/0222162 | A1 * | 9/2007 | Stoner | F16J 15/166 277/589 |
| 2013/0213717 | A1 * | 8/2013 | Bise | E21B 10/62 175/388 |
| 2013/0230352 | A1 | 9/2013 | Goulet et al. | |
| 2014/0298692 | A1 | 10/2014 | Marchand | |
| 2015/0167399 | A1 * | 6/2015 | Kuhn | E21B 4/02 464/18 |
| 2018/0085834 | A1 * | 3/2018 | Grolimund | B23B 51/0473 |

\* cited by examiner

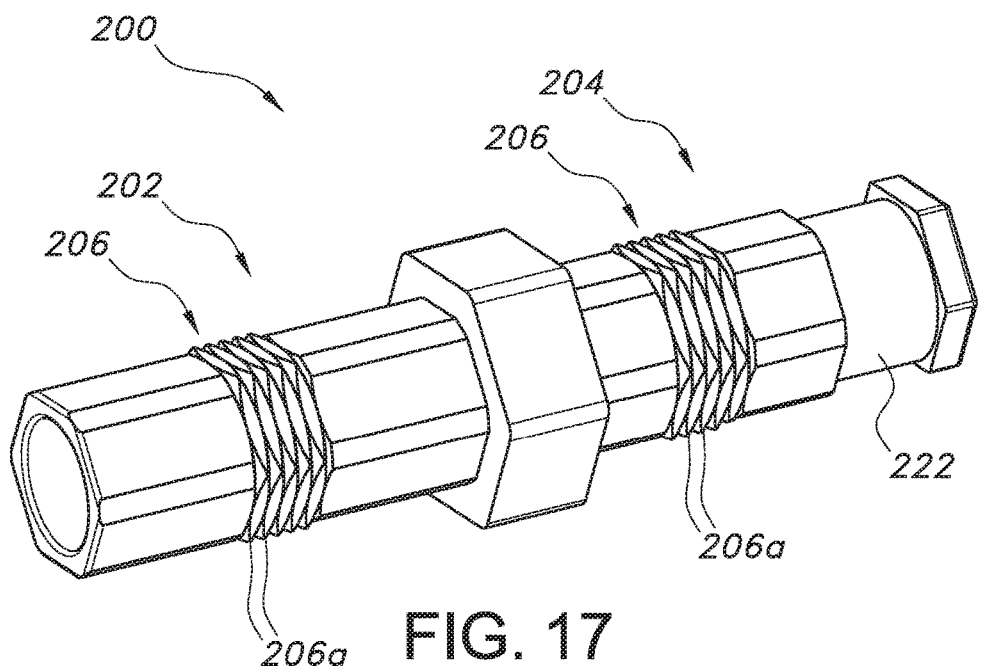
FIG. 17
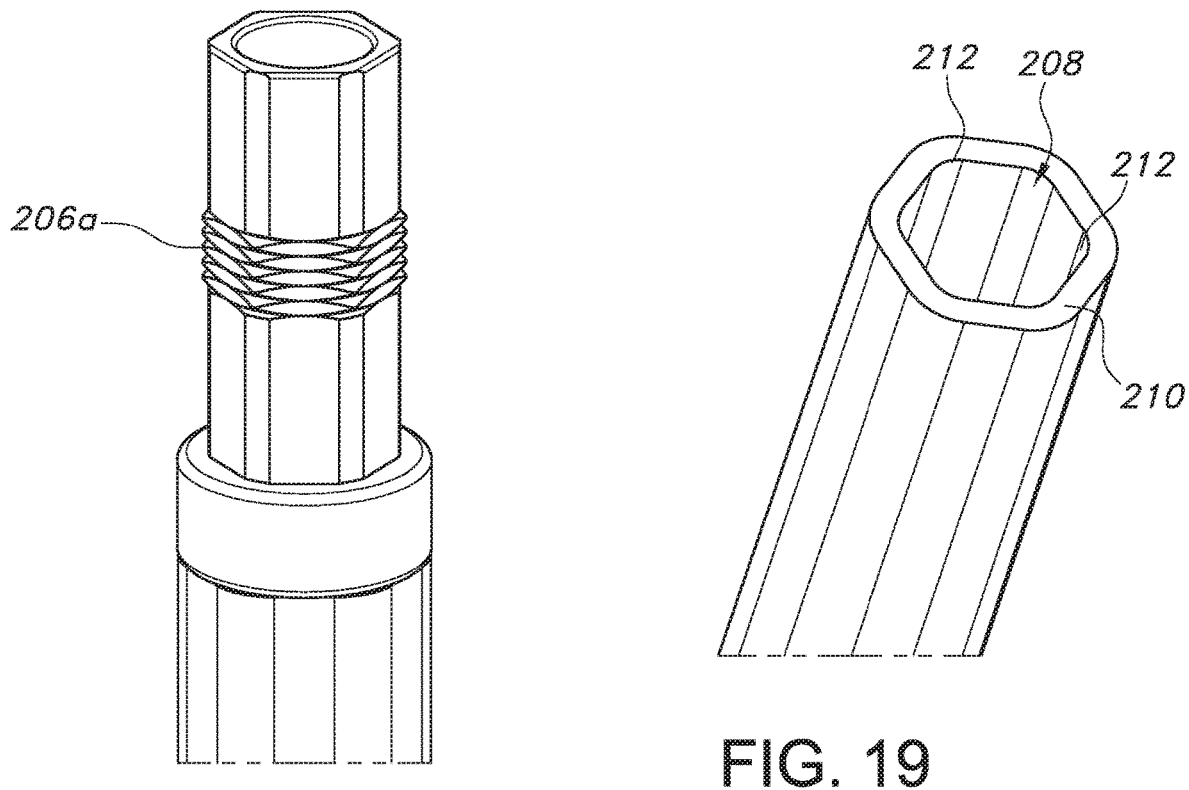
FIG. 18
FIG. 19

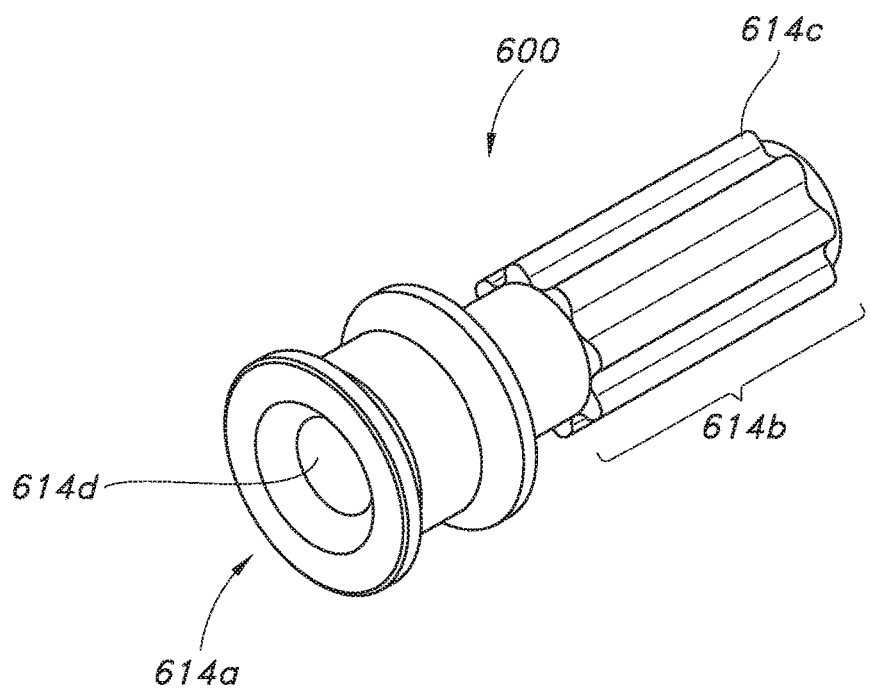
FIG. 25
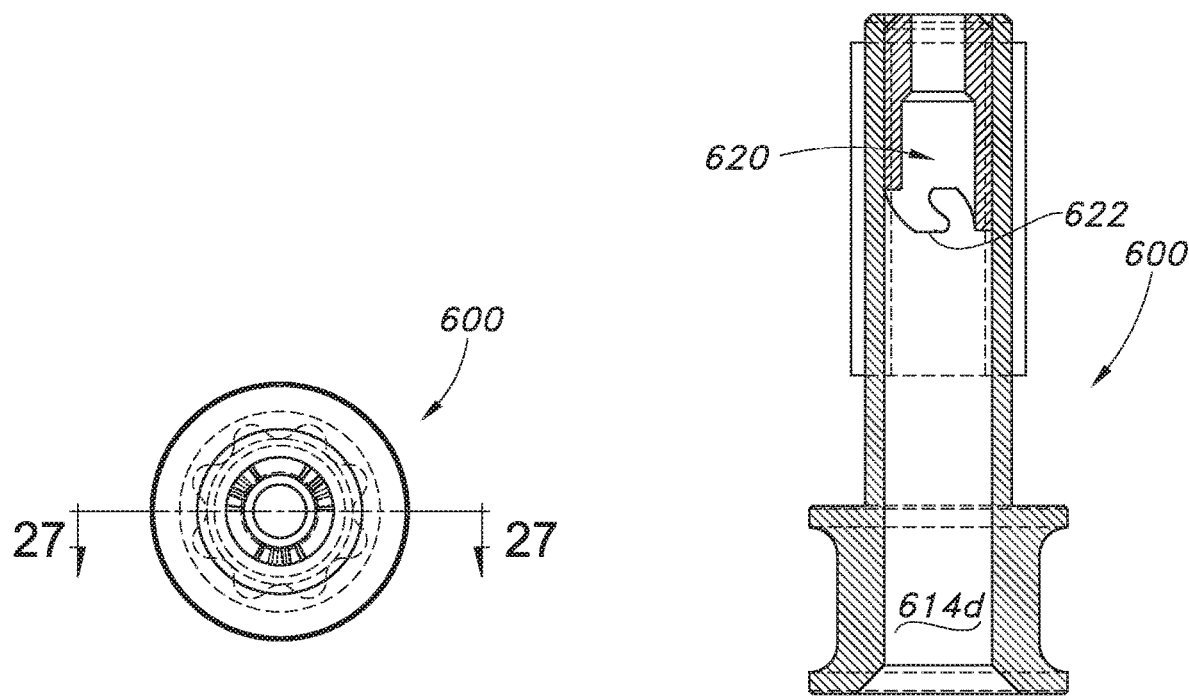
FIG. 26
FIG. 27

QUICK-RELEASE COUPLING FOR DRILLING AND RELATED METHODS

This application claims the benefit of U.S. Provisional Patent Application Nos. 62/625,605 and 62/743,196, the disclosures of which are incorporated herein by reference. The disclosure of International Application No. PCT/US2017/067639 is incorporated herein by reference.

TECHNICAL FIELD

This disclosure relates to the drilling arts and, more particularly, to a coupler for quickly and releasably coupling components for use during a drilling procedure, such as, for example, sections of a drilling element or steel, a carrier and a bit, a chuck and a drill steel, or the like.

BACKGROUND

Forming boreholes in the earth, and rock or mineral formations in particular, typically involves the use of elongated drilling elements, or "steels." To extend the reach of the borehole, many of these steels may be coupled together during the course of the drilling process, and then decoupled once the borehole is completed.

In the past, others have proposed drill steels that have threaded male and female ends that may be used to form the desired releasable coupling. However, such a threaded engagement has certain limitations. For one, the typical threading is relatively long, and thus can require multiple rotations of a relatively heavy drill steel to form a secure connection. Conditions under which the coupling is formed are also often dirty and, in underground mines, dark, and it can be difficult to establish a threaded connection in a quick or reliable manner. Perhaps the more significant issue, though, is that the threads may easily be damaged over time as a result of the rough conditions of use, thus rendering the drill steels or adapters useless or subject to costly and frequent repair.

Alternative connection arrangements have been proposed in an effort to address these issues. An example is a bayonet-style fitting found in U.S. Pat. No. 5,746,279, the disclosure of which is incorporated by reference. However, radial pins are subject to damage when used in harsh conditions, such as in underground mine applications. Moreover, the corresponding slots can become clogged with debris, making it impossible to establish the connection in an easy or reliable manner. Such pins also do not serve to maximize the driving engagement force provided.

Accordingly, a need is identified for a new and improved quick-release coupler. The coupler would be especially useful on components that are separable in an axial direction (that is, the direction along the long axis of the components, as contrasted with a radial or transverse direction along a radius of the cross-section of the components), and rotated about the axial direction when coupled together, such as for example drill steels, drill bits/carriers, and drill chucks in combination with the foregoing. The coupler would be easy and inexpensive to manufacture using known techniques, without requiring costly, complicated and unreliable threading, and would allow for a reliable coupling to be formed and released in a matter of seconds (including for coupling drilling elements or "steels" together, or for coupling a drilling element to a chuck). The arrangement would be such that a maximum amount of driving force is transmitted when the components are engaged, yet release could be achieved in a matter of seconds, as the use of added mechanical fasteners (such as screws or pins) could be avoided.

SUMMARY

According to a first aspect of this disclosure, an apparatus for forming a releasable connection is provided. The apparatus comprises a first part adapted for coupling with a second part by a quick-release coupling formed by a first projection of the first part having an at least partial dovetail shape and a recess of the second part having an at least partial dovetail shape. The opening in the recess is adapted for receiving the projection in an axial direction.

In some embodiments, the projection comprises a full dovetail shape. The recess may also comprise a full dovetail shape. The first part may be at least partially tubular and the second part is adapted to nest at least partially within the first part. The first part may include two or more projections and the second part includes two or more corresponding recesses.

In one embodiment, the first part comprises a drill bit and the second part comprises a carrier for the drill bit. The carrier may comprise a chuck adapted for fitting into a socket of a drill head. In another embodiment, the first part is a chuck, the second part is a drill bit, and the apparatus further includes a third part adapted for coupling with the first part and the second part.

The first part or second part may comprise a plurality of external projections. The apparatus may further include a chuck having a plurality of internal projections alternating in position with the external projections to form a selective locking engagement. The plurality of external projections may be petaloidal. The plurality of internal projections may comprise a first set of projections having a first circumferential dimension and a second set of projections having a second circumferential dimension greater than the first circumferential dimension, whereby the plurality of external projections on the first part or second part may pass through the first set of projections and move within the second set of projections when the first part or second part is twisted within the chuck to form a secure locking engagement.

In any disclosed embodiment, the first part or the second part may comprises a seal for sealing between the first and second parts in order to establish fluid communication therebetween.

A further aspect of the disclosure pertains to a drilling system. The drilling system comprises a chuck including at least one first projection or first recess. A carrier includes at least one second projection or second recess for mating with the first projection or first recess of the chuck, and at least one third projection or third recess. A drill bit includes at least one fourth projection or fourth recess for mating with the at least one third projection or third recess of the carrier.

In one embodiment, the carrier comprises a first connector including the at least one second projection or second recess for mating with the first projection or first recess of the chuck. A second connector includes the at least one third projection or third recess, and an intermediate connector is provided for connecting the first and second connectors. Each of the chuck, carrier, and drill projection may include a passage for allowing fluid flow.

In another aspect, the disclosure pertains to an apparatus for interconnecting two drilling elements. The apparatus comprises an adapter having a first end for engaging one of the two drilling elements and a second end for engaging another of the drilling elements. At least first end includes a first cutter for scoring an internal portion of the one drilling element upon being inserted therein and rotated.

In one embodiment, the second end includes a second cutter. The first or second cutter may comprise a plurality of axially spaced teeth. The first end may have a hexagonal cross-section, and the first cutter or the second cutter has an outer diameter greater than an outer diameter of the hexagonal cross-section. A seal may also be provided for sealing with one of the drilling elements.

Still a further aspect of the disclosure pertains to an apparatus for interconnecting two drilling elements. The apparatus comprises an adapter having a first end for engaging one of the drilling elements and a second end for engaging another of the drilling elements. The first end is frictionally enhanced for engaging an internal portion of the one drilling element upon being rotated.

In one embodiment, the frictional enhancement is provided by an elastomeric material. For instance, the elastomeric material may comprise a rubber strip. In the case where the first end has a hexagonal cross-section, and the rubber strip may extend along at least one flat of the first end.

Yet a further aspect of the disclosure comprises an apparatus for interconnecting two drilling elements. The apparatus comprises an adapter having a first end for engaging one of the drilling elements and a second end for engaging another of the drilling elements. The first end includes at least one radial projection elongated in an axial direction for engaging an internal portion of the one drilling element upon being rotated.

In one embodiment, the radial projection is rounded. In this or other embodiments, the radial projection is generally square. The first end may include a plurality of radial projections. The second end may include a recess with an at least partial dovetail shape. The second end may include a projection with an at least partial dovetail shape.

A further aspect of the disclosure pertains to an apparatus for receiving a drilling element within a chuck. The apparatus comprises an adapter configured for forming a selective locking engagement within the chuck. The adapter includes a bore for receiving the drilling element, and the bore includes a recess having a projection with an at least partial dovetail shape for engaging the drilling element.

In some embodiments, the chuck includes a plurality of internal projections within the first opening and the adapter includes a plurality of external projections alternating in position with the internal projections to form the selective locking engagement. The plurality of external projections may be petaloidal. The plurality of internal projections may comprise a first set of projections having a first circumferential dimension and a second set of projections having a second circumferential dimension greater than the first circumferential dimension, whereby the plurality of external projections on the adapter may pass through the first set of projections and move within the second set of projections when the adapter is twisted within the chuck to form the selective locking engagement.

Still other aspect of the disclosure pertain to methods, such as a method of forming a coupling between first and second drilling elements of a drilling arrangement. The method may comprise inserting an at least partial dovetail projection of a first adapter part into a corresponding recess in a second adapter part, and associating the first adapter part with the first drilling element and the second adapter part with the second drilling element.

The associating step may be performed before or after the inserting step. The associating step may comprise inserting the first adapter part into a first tubular end of the first drilling element and inserting the second adapter part into a second tubular end of the second drilling element. The associating step may comprise inserting the first adapter part into a first hexagonal socket end of the first drilling element and inserting the second adapter part into a second hexagonal socket of the second drilling element. The inserting step may comprise inserting a full dovetail projection of the first adapter part into the corresponding recess in the second adapter part.

The inserting step may comprise inserting one of a plurality of at least partial dovetail projections of a first adapter part into each of a plurality of corresponding recesses in a second adapter part.

A further aspect of the disclosure pertains to method of forming a coupling between first and second drilling elements of a drilling arrangement. The method comprises inserting an adapter part including a first cutter into an open end of the first drilling element and causing the first cutter to cut into an interior surface of the first drilling element to establish a connection therebetween. The causing step may comprise rotating the first cutter. The method may further include inserting a second cutter of the adapter part into the second drilling element, and causing the second cutter to cut into an interior surface of the second drilling element.

Yet another aspect of the disclosure pertains to a method of forming a coupling between first and second drilling elements of a drilling arrangement. The method comprises inserting an adapter part including a first end having a first frictional enhancement into a first open end of the first drilling element. The method further comprises inserting a second end of the adapter part into a second open end of a second drilling element.

The disclosure also pertains to a method of forming a coupling between first and second drilling elements of a drilling arrangement. The method comprises inserting an adapter part including a first end having a first radial projection into a first open end of the first drilling element. The method further comprises inserting a second end of the adapter part into a second open end of a second drilling element. In one embodiment, the first end of the adapter part includes a plurality of circumferentially spaced radial projections. In this or other embodiments, the second end of the first adapter part includes an at least partial dovetail projection and a recess.

The disclosure further pertains to a method of forming a coupling between a drill chuck and a drilling element. The method comprises providing an adapter with a plurality of external projections for engaging corresponding recesses formed by a plurality of internal projections in the drill chuck. The method further comprises providing the adapter with an internal coupler for coupling with the drilling element, the coupler having an at least partial dovetail shape and a recess having an at least partial dovetail shape. In one embodiment, the plurality of internal projections comprise a first set of projections having a first circumferential dimension and a second set of projections having a second circumferential dimension greater than the first circumferential dimension, and the method comprises passing the external projections of the adapter through the first set of projections and twisting the adapter to move the plurality of external projections within the second set of projections form the selective locking engagement.

BRIEF DESCRIPTION OF THE DRAWING FIGURES

The accompanying drawing figures incorporated herein and forming a part of the specification, illustrate several aspects of the disclosed inventions and, together with the description, serve to explain certain principles thereof. In the drawing figures.

Figure 21:
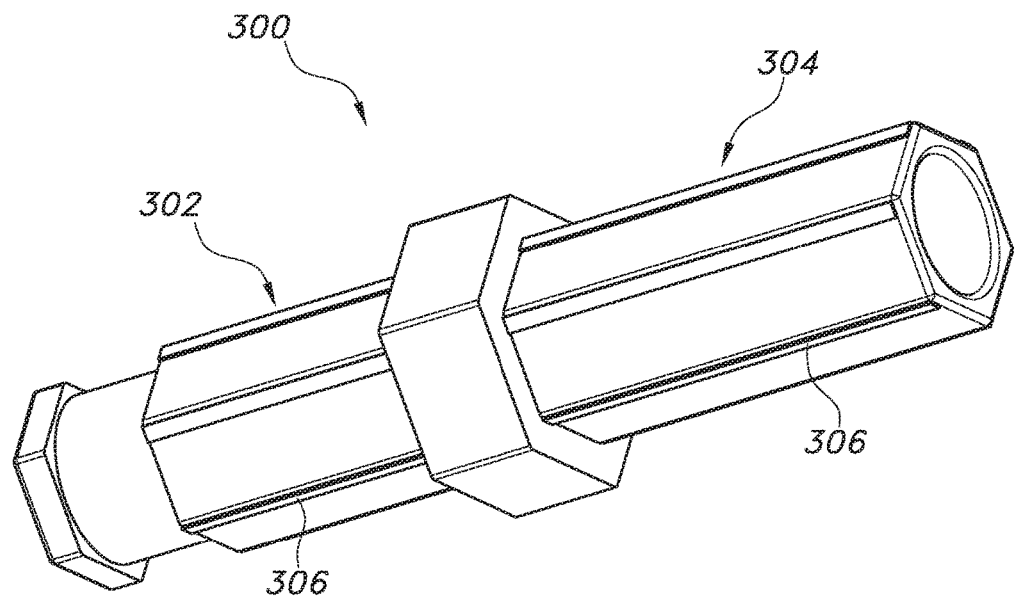
Figure 22:
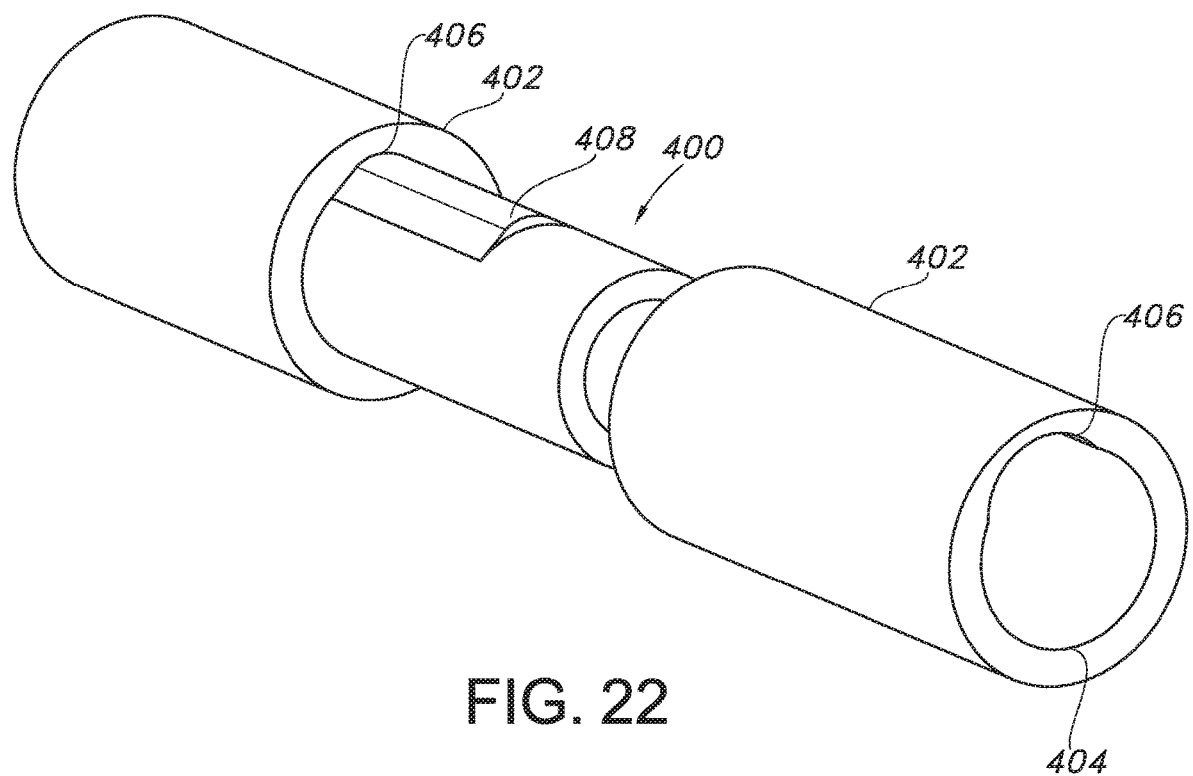
Figure 23:
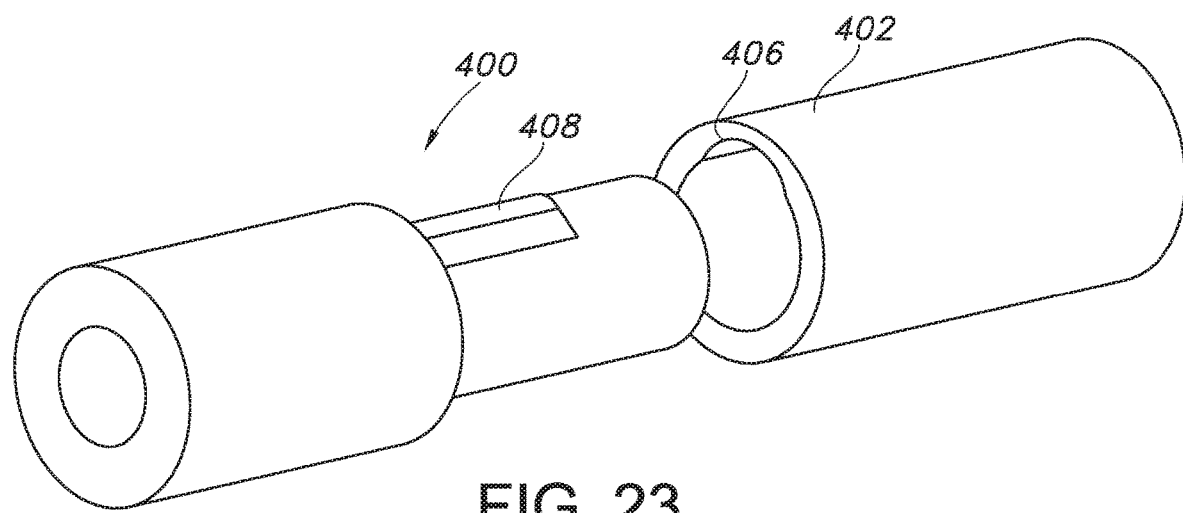
Figure 24:
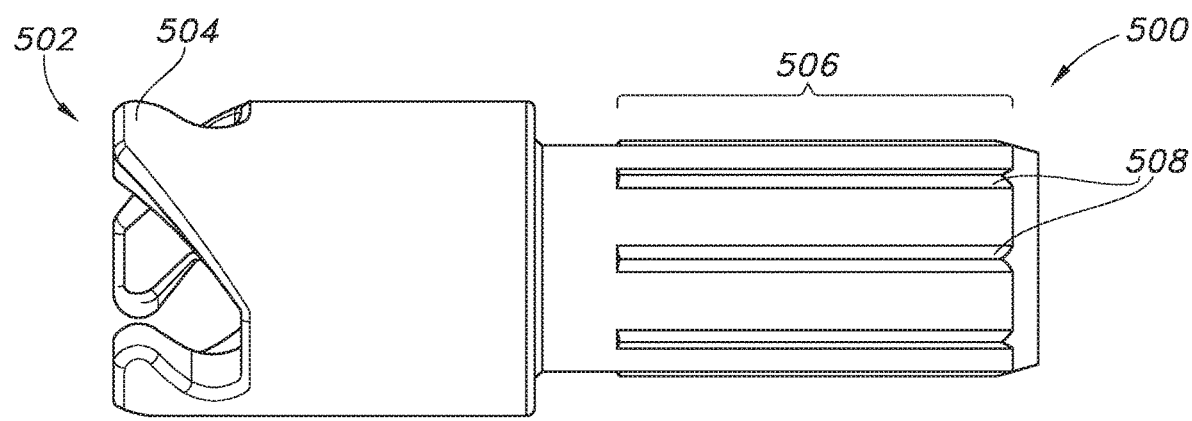
Figure 29A:
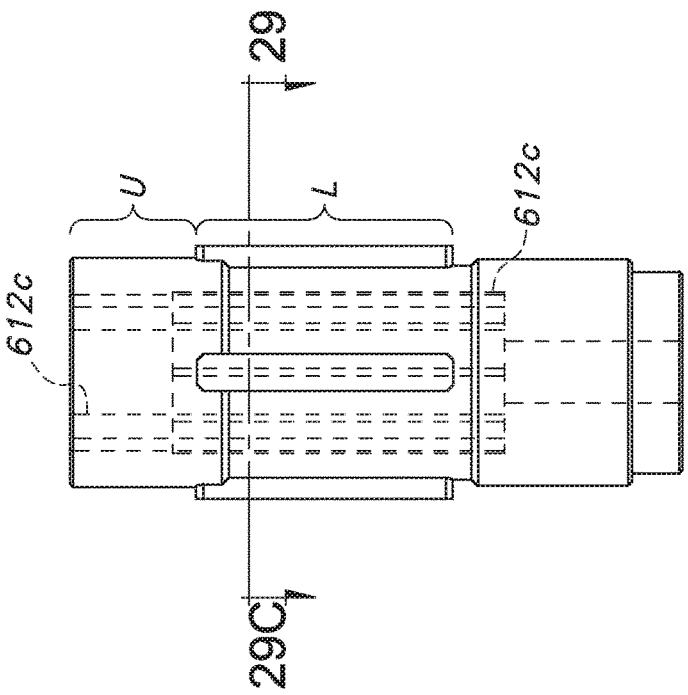
Figure 29B:
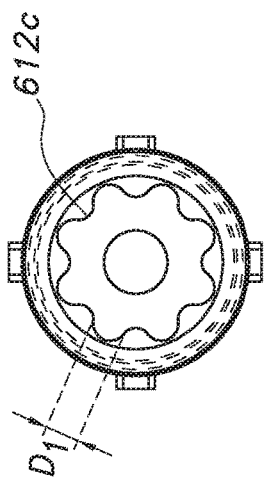

FIGS. 17, 18, 19, 20A, 20B, 20C, and 20D illustrate a further embodiment of a coupling;

FIG. 21 is a perspective view of another embodiment of a coupling;

FIGS. 22 and 23 are perspective views of still a further embodiment of a coupling;

FIG. 24 is yet another perspective view of an embodiment of part of a coupler according to the disclosure; and FIGS. 25, 26, 27, 28, 29A, 29B, 29C, 30, and 31 illustrate a further embodiment of the coupler as applied to a "twist lock" arrangement.

Reference will now be made in detail to the present preferred embodiments of the disclosed inventions, examples of which are illustrated in the accompanying drawing figures.

DETAILED DESCRIPTION

Reference is now made to FIGS. 1-8, which illustrate a quick-release coupler or adapter 10 for coupling first and second parts together, such as for example, sections of drilling elements or steels 12, 14. In the illustrated embodiment, each drill steel 12, 14 has a bore 16, and the adapter 10 includes ends 18 having a corresponding size and shape for operatively engaging the bores 16 (which may be different sizes). The particular version is shown as having bores 16 with a generally polygonal (hexagonal) cross-section, and the ends 18 are matched. However, circular or round bores/ends could also be used. Optional biasing structures such as spring retainers (not shown) or friction rings may also be provided for assisting in securing the ends 18 in the bores 16.

The adapter 10 comprises first and second separable portions 20, 22 that together form a "quick release" coupling, which means that the portions 20, 22: (1) do not include threads, screws or like removable connectors for interconnecting them, which thus allows for fast assembly and disassembly; and (2) can be released by rotating one portion relative to the other less than a full rotation (e.g, 360 degrees), which of course is not possible with conventional helical threading. In the illustrated arrangement, as perhaps best understood with reference to FIG. 4, the first portion 20 of the adapter includes a male connector, such as a generally polygonal or "dovetail-shaped" projection 24, which may be considered to form an axially extending tooth. The projection 24 may be raised above a nominal diameter of a generally cylindrical shaft 26 of the first portion 20 adapted to fit within a passage of the second portion 22. The shaft 26 also includes a connected collar 27, and extend in an axial direction X.

Figure 1:
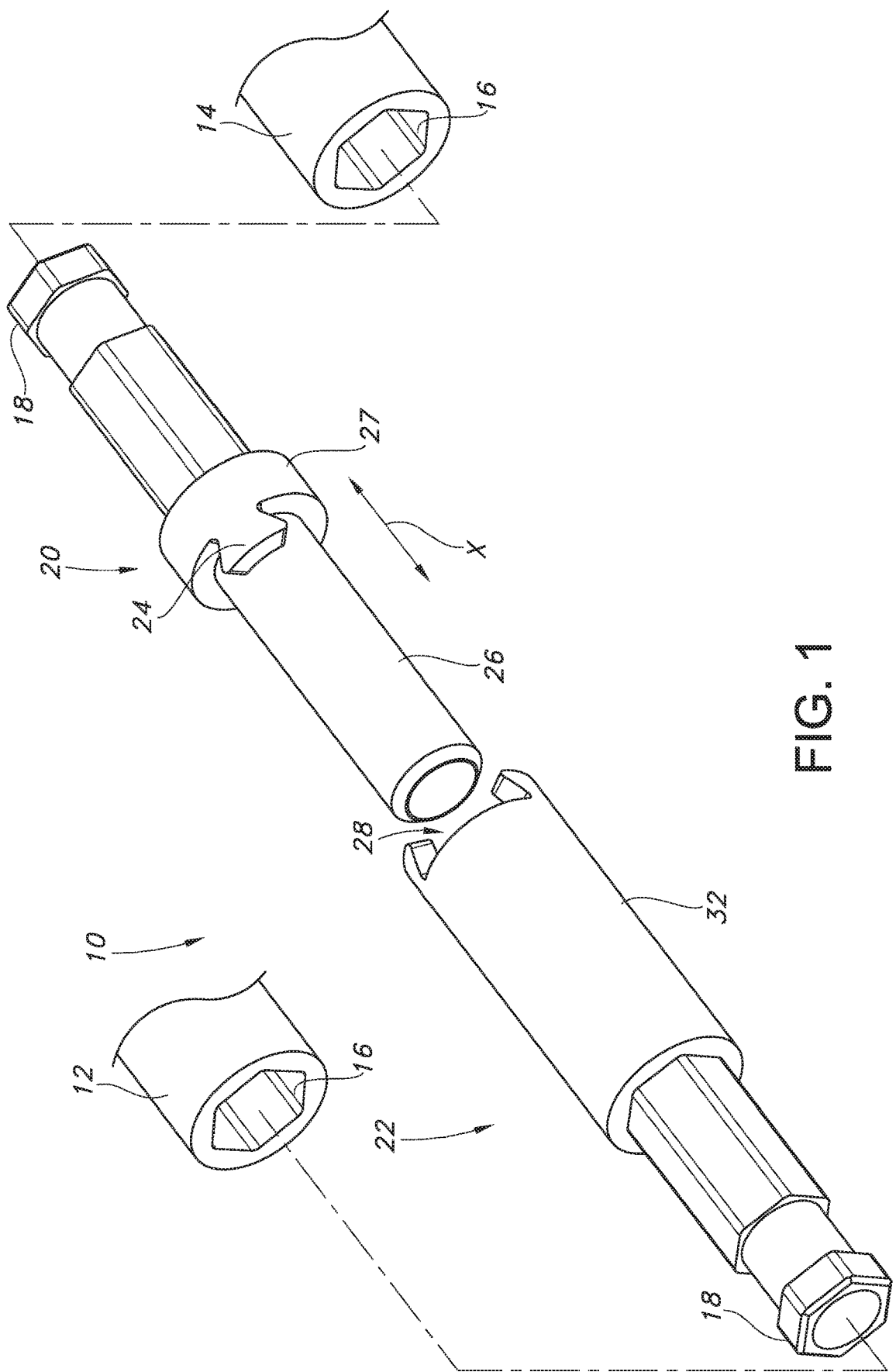
FIG. 1 is an exploded perspective view of an adapter for coupling first and second parts, such as tubular drill steels, according to a first embodiment of the disclosure.

A corresponding recess 28 may be formed in a sidewall 32 of a generally cylindrical tubular part 30 of the second portion 22, which part is adapted for receiving the shaft 26 (which may also be tubular, and thus together with the portion 20 form a passage for directing or recovering fluid during a drilling process; e.g., a bailing fluid, such as air or water under pressure). For example, as shown in FIG. 1, each portion 20, 22 may comprise an external, peripheral seal (see FIG. 20A, seal 224) along an undersized (e.g., reduced diameter) section thereof, which is provided for sealing within a corresponding bore of a drilling element/ steel or like component in which the portion is received. As can be appreciated, since the portions 20, 22 have generally circular cross-sections, the projection 24 and recess 28 each have non-linear (e.g., arcuate) faces, both in a radial and axial direction.

Figure 2:
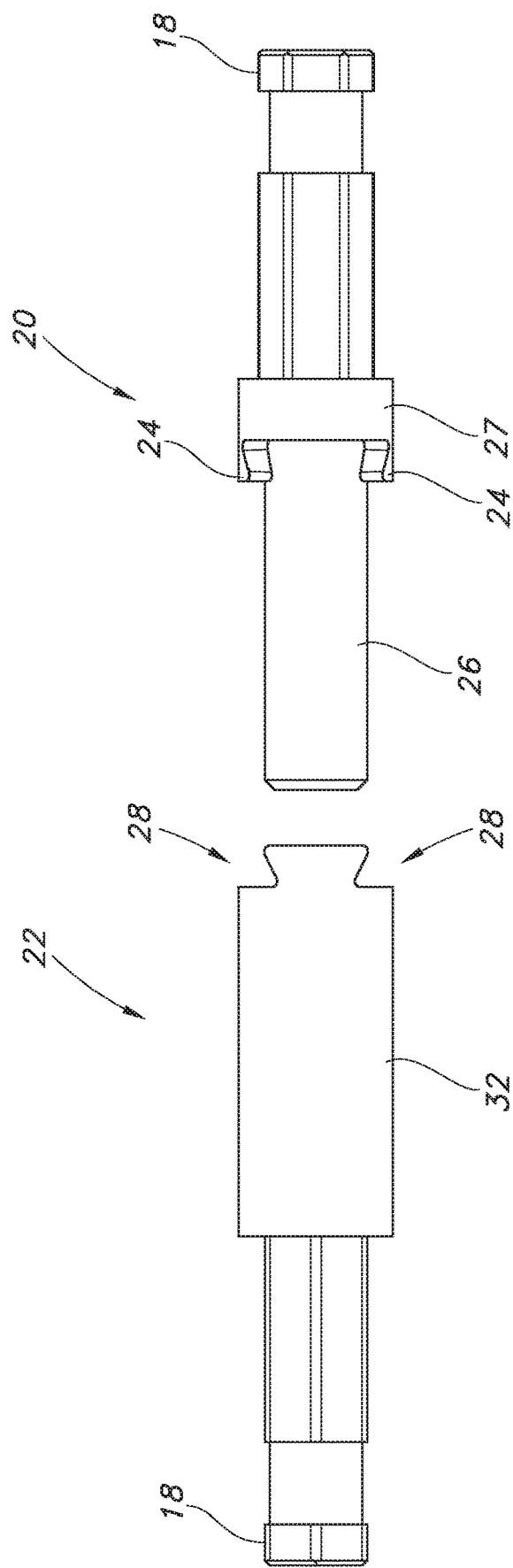
FIG. 2 is an exploded side view of the coupler of FIG. 1.

As can perhaps be best understood from FIG. 2, the dovetail connection (projection 24 and recess 28) may be repeated on an opposite side of the respective portions 20, 22 of the adapter 10, but this is considered optional. In such case, it can be appreciated that the portions 20, 22 are essentially reversed (that is, the oppositely extending projection is on the above-described portion 22 with recess 28, and the recess is on the above described portion 20 with projection) and alternate in the circumferential direction. Likewise, the arrangement could be reversed, such that the projection and recess are on opposite sides of the first and second portions 20, 22.

Figure 3:
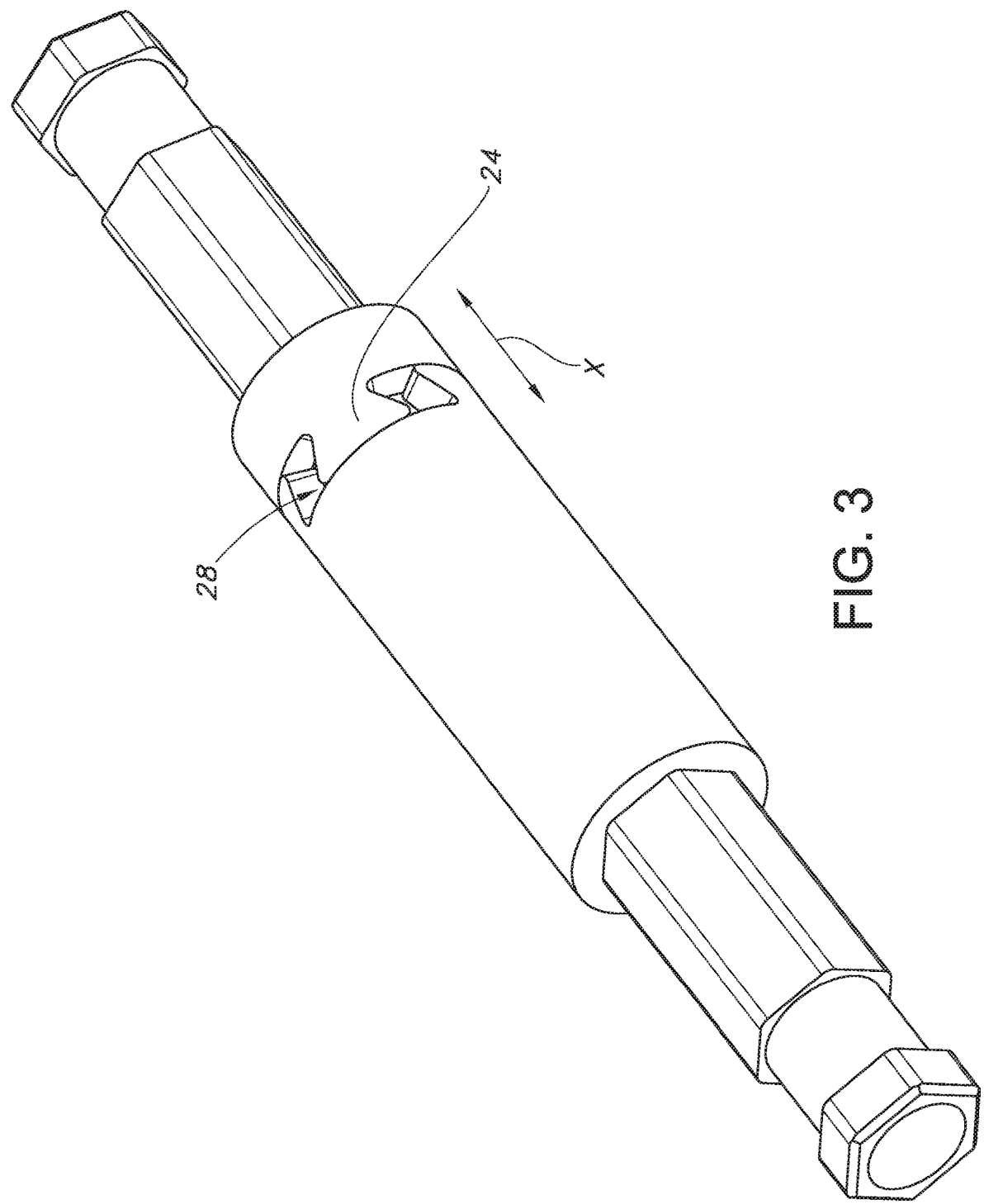
FIG. 3 is a perspective view of the coupler of FIG. 1 in an assembled condition.
Figure 4:
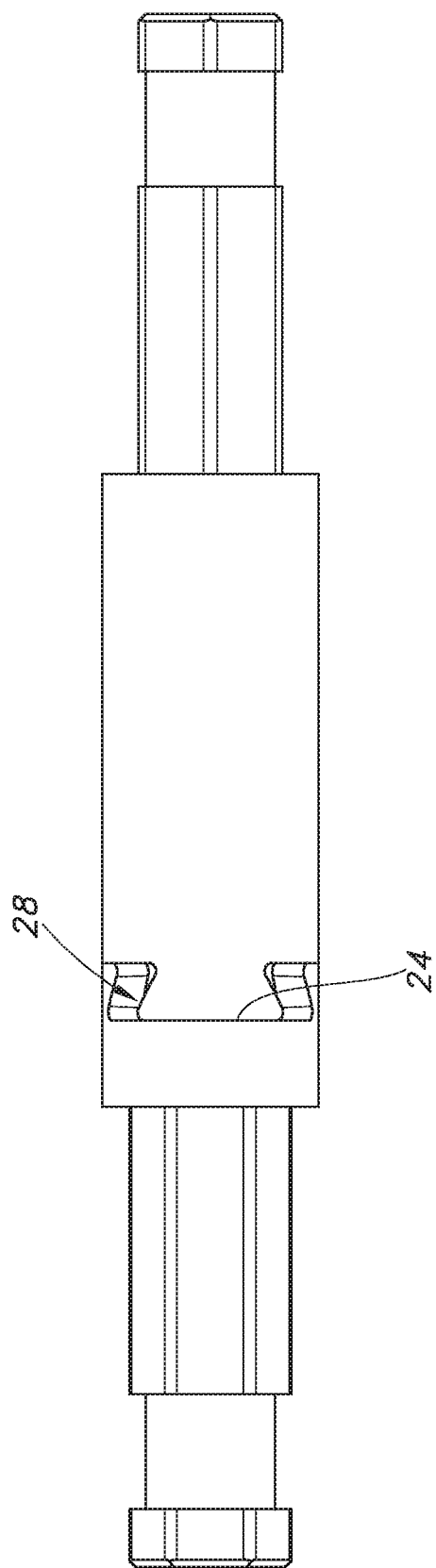
FIG. 4 is a side view of the coupler of FIG. 3.

To interconnect the adapter portions 20, 22 in a releasable manner, the shaft 26 of the first portion 22 may be inserted into the tubular part 30, and the projection 24 aligned with the recess 28. As can perhaps be best understood from FIG. 7, the size of the narrow end of the recess 28 in the circumferential direction is such that it can receive the largest part of the projection 24 in the axial direction X without interference. Thus, as shown in FIGS. 3 and 4, relative movement of the portions 20, 22 in the axial direction X toward each other allows for the projection 24 to be fully received in the recess 28, yet relative twisting movement remains possible as a result of the oversized nature of the recess relative to the projection.

Figure 5:
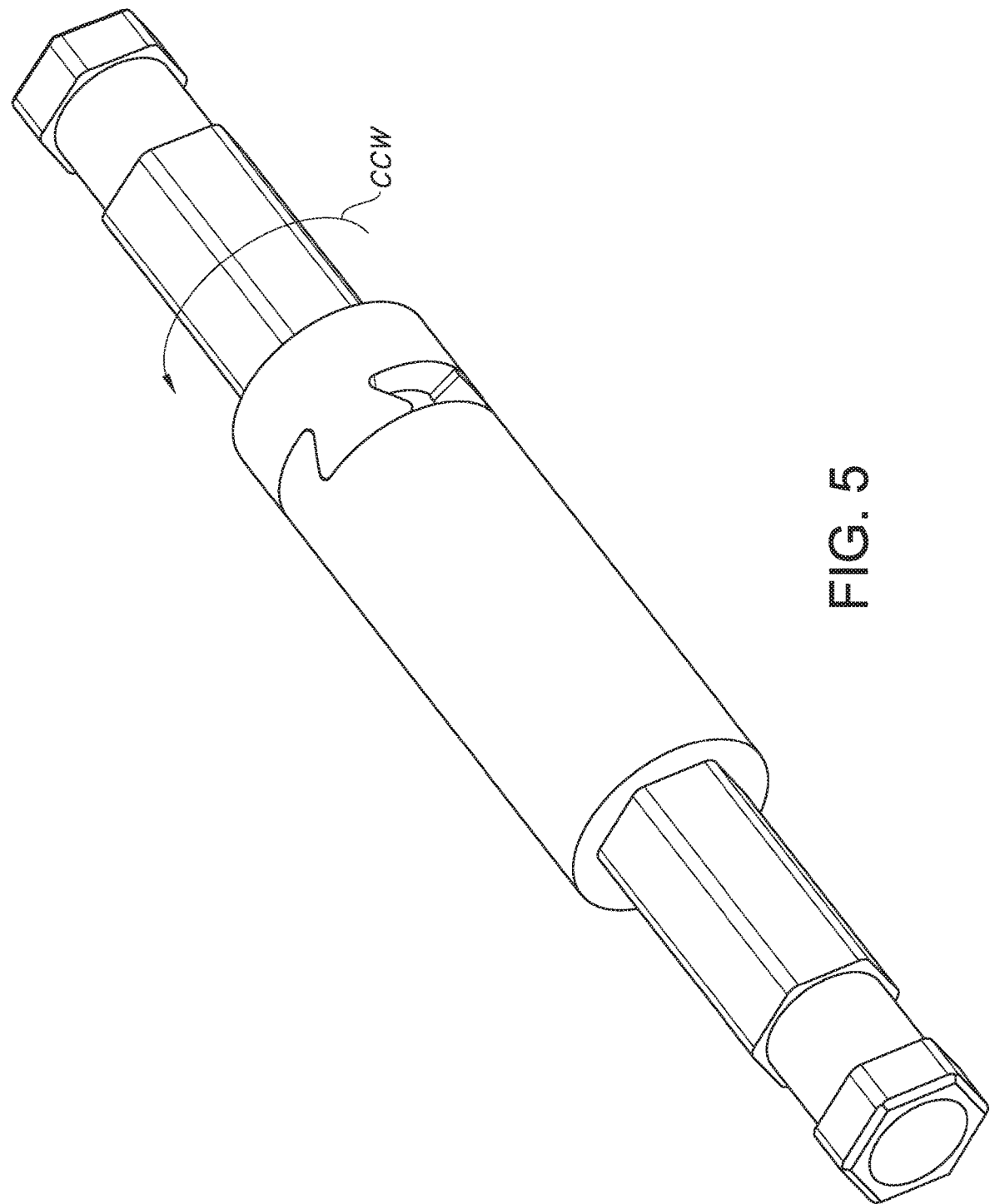
FIG. 5 is a perspective view of the coupler of FIG. 1.
Figure 6:
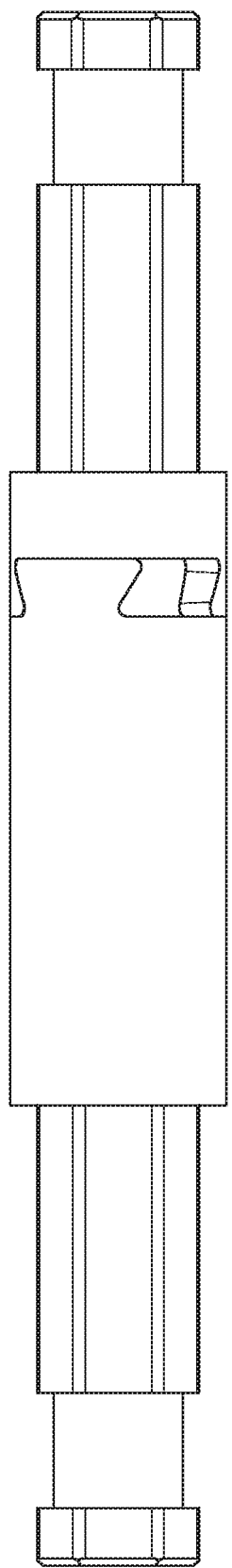
FIG. 6 is a side view of the coupler of FIG. 5.
Figure 10:
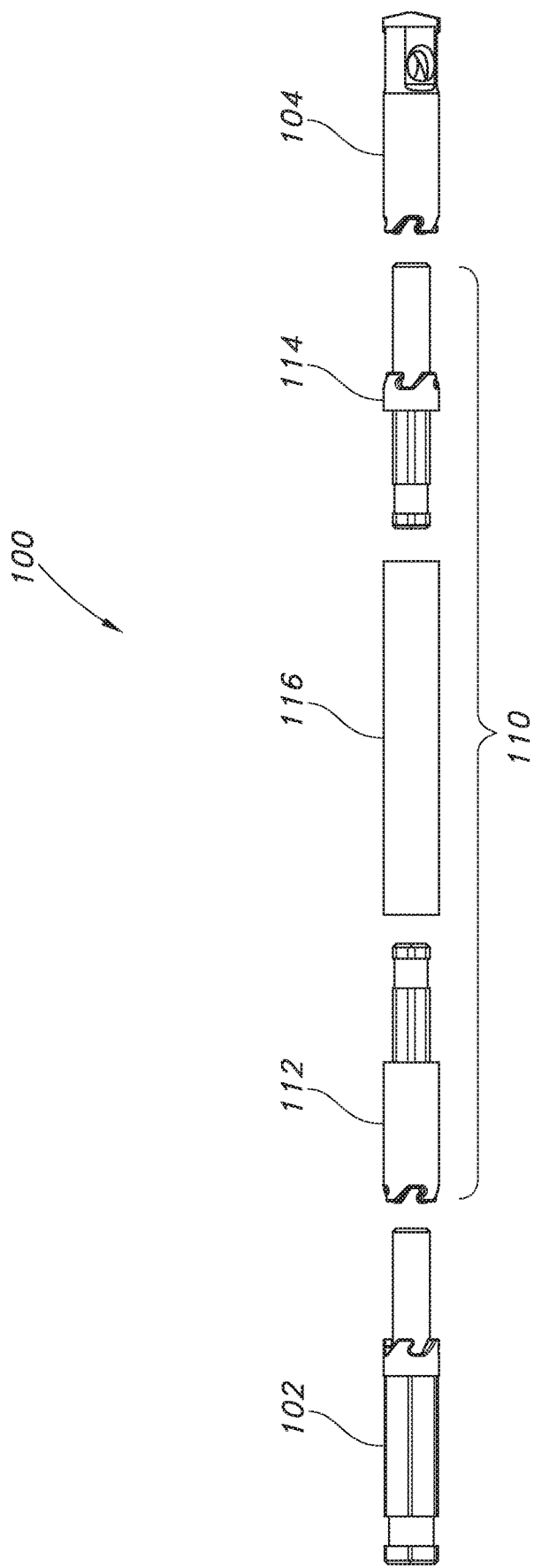
FIG. 10 is an exploded side view of the coupler of FIG. 9.
Figure 11:
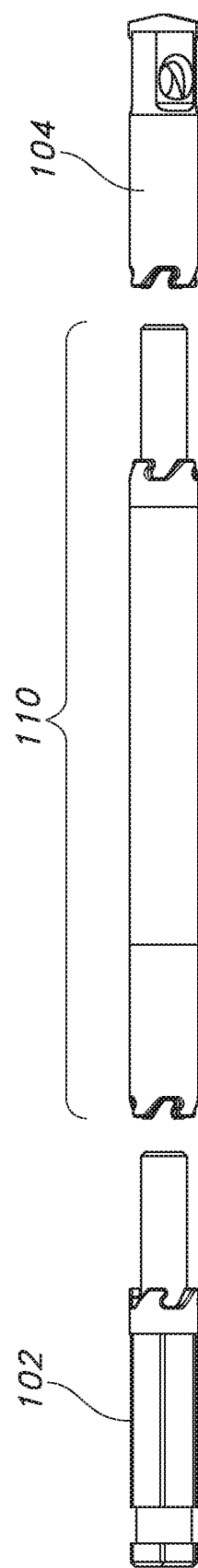
FIG. 11 is a partially exploded side view of the coupler of FIG. 10.
Figure 12:
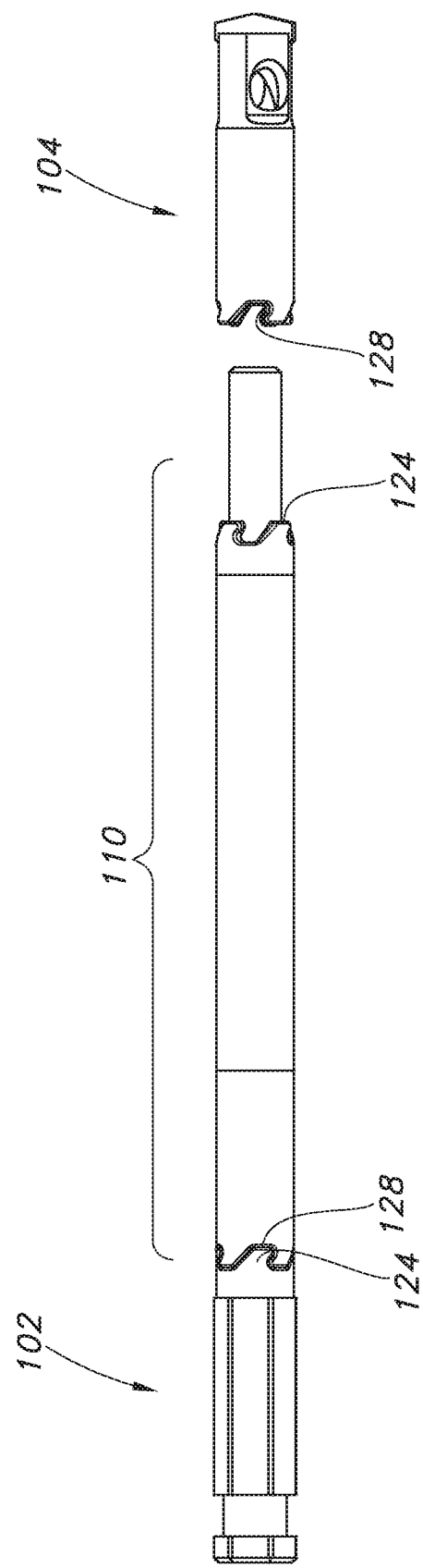
FIGS. 12 and 13 are partially assembled views of the coupler of FIG. 10.
Figure 13:
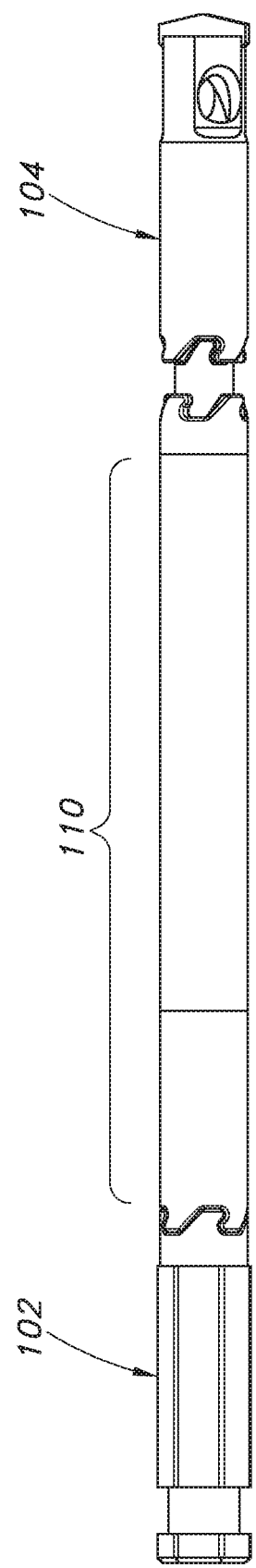
Figure 14:
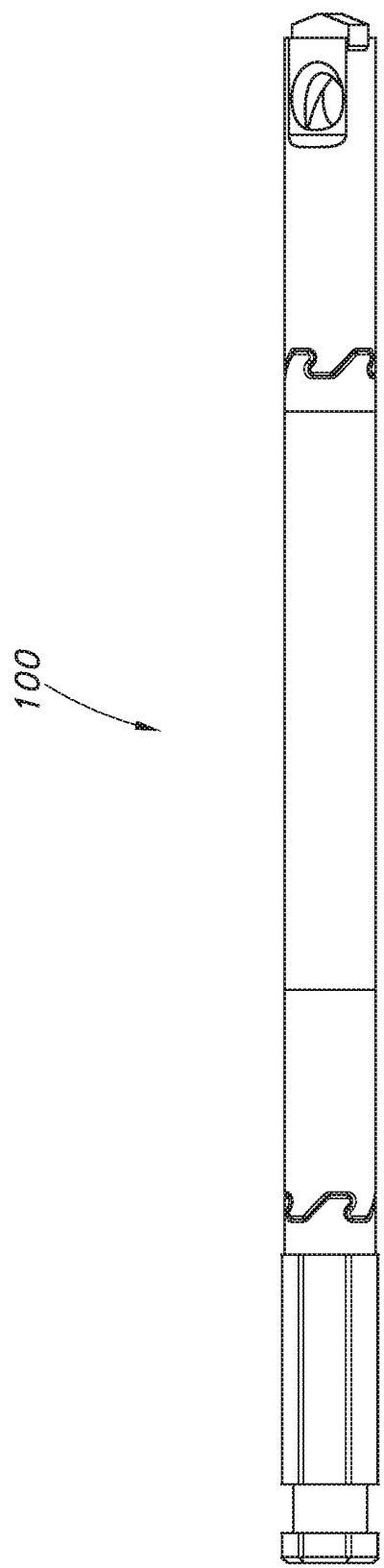
FIG. 14 is a fully assembled side view.

As can perhaps best be appreciated from FIGS. 5 and 6, the relative twisting of the portions 20, 22 causes the projection 24 to seat in a matching part of the recess 28. As a result, a flat driving face of the projection 24 substantially matches and fully engages a flat driven face of the recess 28, which faces are tapered circumferentially in the axial direction X. Thus, during rotation in the corresponding direction (counterclockwise in FIG. 10), the coupling thus formed serves to transmit torque and rotary movement from one associated drilling element or steel to the other. Likewise, as can be appreciated from FIGS. 6 and 7, rotation in the opposite direction (clockwise) may cause the projection 24 to move into the opposite end of the recess 28 and transmit torque in the opposite direction.

When separation is desired, such as for decoupling the drill steels, the portions 20, 22 may simply be twisted such that the oversized end of the projection 24 aligns with the oversized end of the recess 28. Separation of the portions 20, 22 in the axial direction thus allows for the drill steels 12, 14 to be separated in a matter of seconds. As threads are not used, the separation can occur without even rotating either associated drill steel a full rotation (indeed, movement in the circumferential direction need only be far enough to separate the engagement of projection 24 with recess 28 and move to the aligned condition of FIG. 7, which may be millimeters, or otherwise less than a full 360 degrees). Moreover, the oversized nature of the recess 28 relative to the projection 24 allows for the coupling to be reliably formed even in situations where the drill steels are not perfectly aligned or crooked, since there may be sufficient "play" in the engagement thus formed to allow for modest misalignments in the circumferential and axial directions (which could not be the case with a threaded connection). The teeth serving as the projections 24 also have a robust nature with a larger cross-section and area of connection to the drill steels 12, 14 than would be the case with a simple cylindrical pin extending radially.

Modifications are possible in view of the above teachings. For instance, the projection 24 and recess 28 are shown as having a dovetail shape, such that twisting in either direction past an aligned position for separation creates a captured engagement. However, it is possible to provide only a partial or "half-dovetail" arrangement such that the engagement is established in only one rotational direction. In such case, the operator of the drill would simply always rotate in the direction that maintains engagement, and separation would be achieved by simply twisting in the opposite direction to allow for the projection to be separated from the recess.

While the quick-release coupling is also shown in connection with an adapter 10 for coupling two drilling elements or steels 12, 14 it may also have other applications. For instance, the coupling described may be used to connect a drill bit with a carrier, a drill bit or steel with a chuck, or any combination of the foregoing. Thus, with reference to FIGS. 9-14, a drilling system 100 is provided, which includes a drill chuck 102 and a drill bit 104 that are connected by an adapter 110. The adapter 110 may be formed of first and second connectors 112, 114 for connecting with the chuck 102 and bit 104, respectively, and also for connecting with an intermediate connector 116.

In the illustrated embodiment, the arrangement is such that a male end 102a of the chuck 102 is adapted for being received in a bore 112a of the first connector 112 (but this arrangement could be reversed), which may include corresponding projections and recesses for forming a secure, but releasable coupling. In the illustrated embodiment, the projections are one or more modified "half-dovetail" projections 124 or teeth, and similarly shaped recesses 128 are provided in the first connector 112. As perhaps best understood with reference to FIG. 12, the recess 128 has an entryway that is tapered in the circumferential direction, which corresponds to a matching surface on the projection 124. Engagement in the axial direction thus guides the projection 124 to a fully engaged or seated position, and reversal allows for it to be readily unseated for separating the corresponding components.

It may also be appreciated that more than one projection/recess combination may be provided. For example, the version in FIGS. 9-14 includes four projections and recesses, but any number may be used. Moreover, it can be appreciated that, for each projection 124 in one component, there is a recess 128 in the opposite component, and vice-versa, such that the projections and recesses alternate in the circumferential direction.

Turning back to FIG. 9, it can be understood that the first and second connectors 112, 114 may also have male ends 112b, 114b for fitting into a bore 116a of the intermediate connector 116 in opposition. Likewise, the second connector 114 may include a male end 114a for insertion into a bore 104a of the drill bit 104 (but the arrangement could be reversed), along with corresponding projections and recesses 128 for forming a releasable connection, yet one fully capable of transmitting driving torque and thrust, as well as a retraction force during withdrawal. Yet, the use of threads, radial projections (which may be susceptible to damage as noted), or narrow slots is avoided. Furthermore, each of the parts may be provided with a central passage for allowing fluid flow, such as a bailing fluid (air, water, etc.), and the illustrated manner of connection advantageously guards against leakage (since the male portions may be fully inserted within the corresponding bores of their counterparts). To help in this regard, seals may also be provided between the various components.

Figure 7:
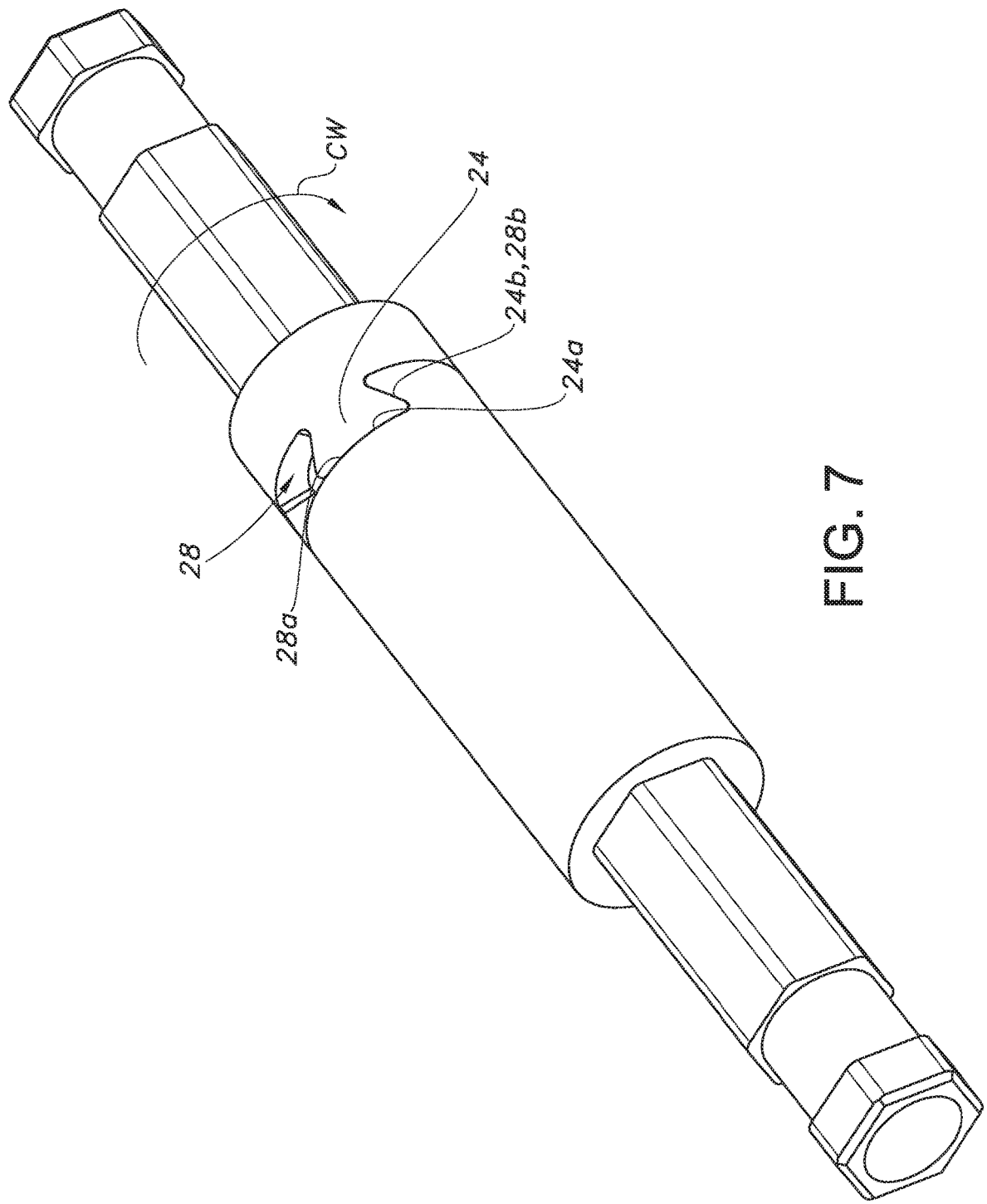
FIG. 7 is a perspective view of the coupler of FIG. 1.
Figure 8:
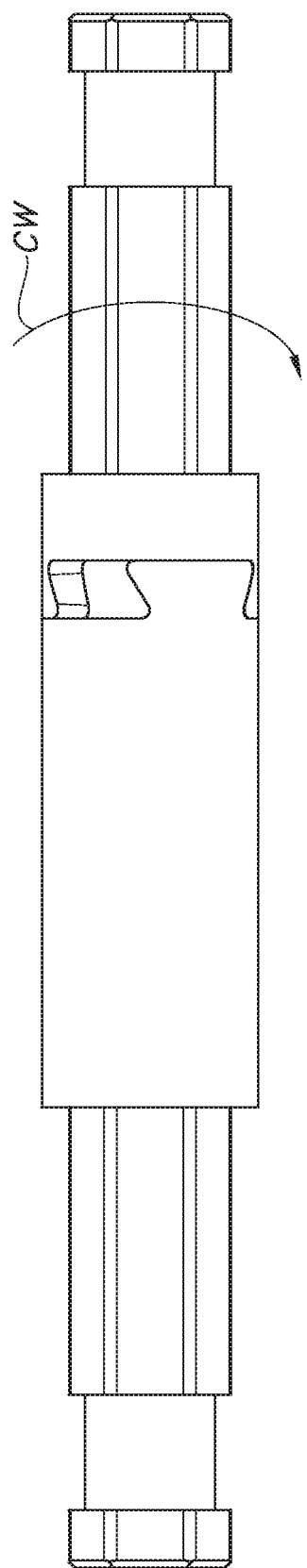
FIG. 8 is a side view of the coupler of FIG. 8.
Figure 9:
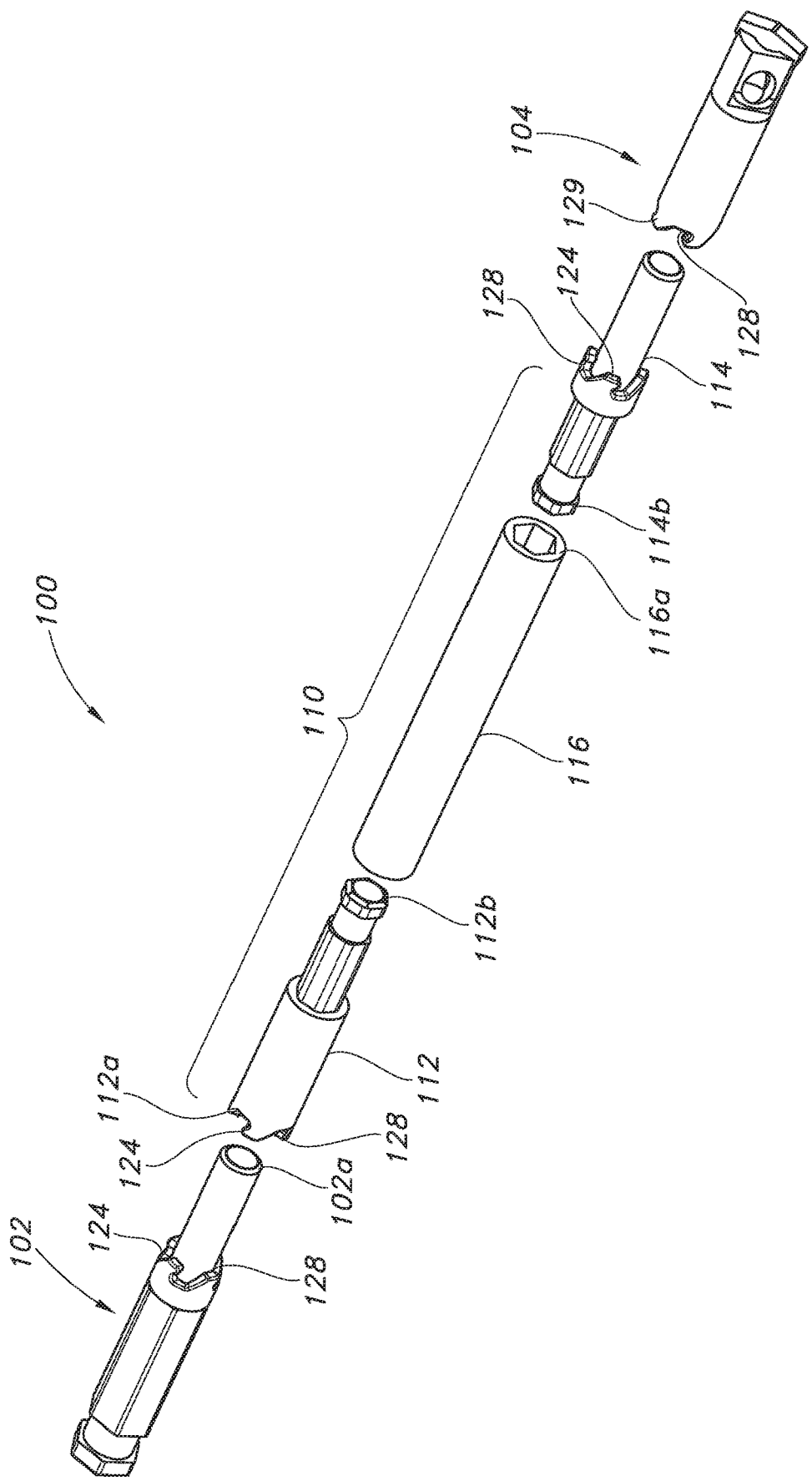
FIG. 9 is an exploded perspective view of a further embodiment of the coupler.
Figure 15:
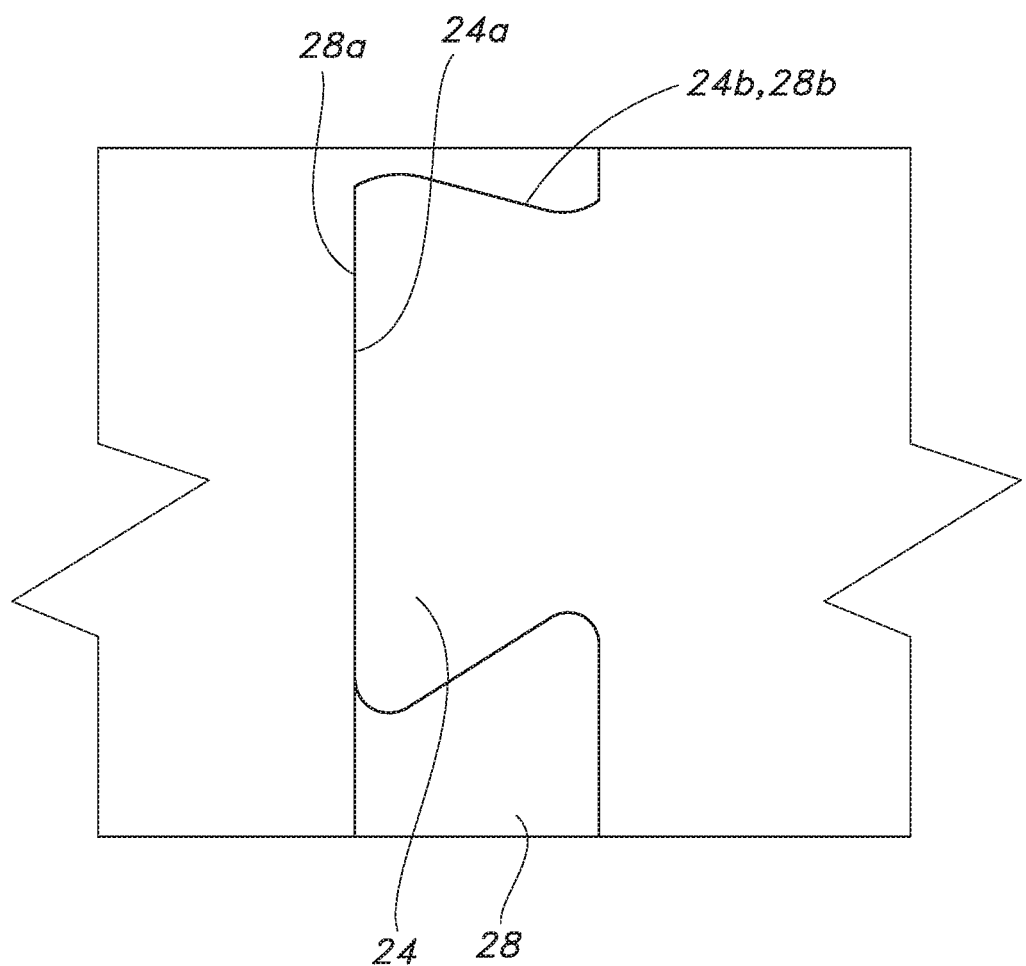
FIG. 15 is an enlarged view of a portion of the coupler of FIGS. 1-8.

Turning specifically to FIG. 7 and also to FIG. 15, it can be understood that the projection 24 or 124 presents a generally flat engagement face 24a, 124a for mating with a corresponding engagement face 28a, 128a of the recess 28, 128. It can also be understood that a similar mating engagement is provided for a projection extending in the opposite direction. This allows for secure driving engagement to be established for advancing the drill steels 12, 14 in the axial direction during forming of the borehole. The area available for thrust is approximately equal to the cross section area of the tubing being used as a drill steel 12, 14. The "bottomed out" nature of the engagement also maximizes the usable area to transmit axial thrust, and also helps to guard against debris and dust entry. During retraction, mating lateral engagement faces 24b, 124b, 28b, 128b of the projection 24 and recess 28 create sufficient engagement to pull back the drill steels 12, 14 from the borehole, but the oversized nature of the recess 28 allows for easy separation by twisting, as outlined in more detail in the following description.

Figure 16:
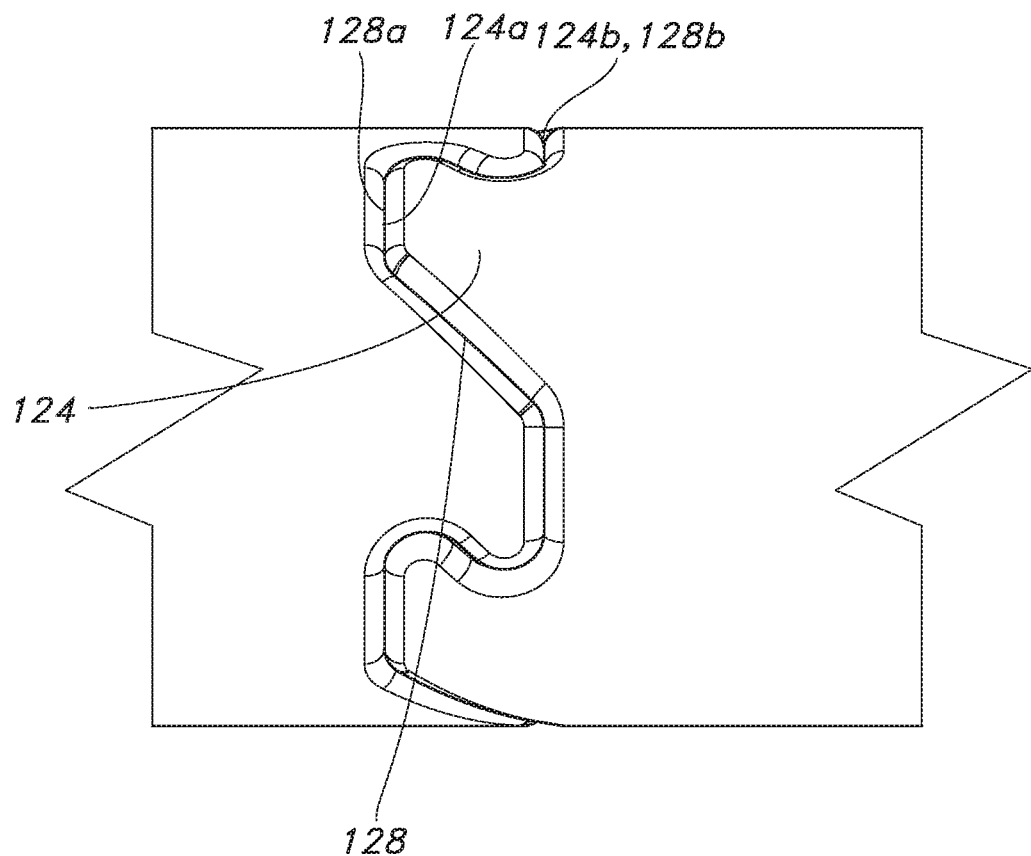
FIG. 16 is an enlarged view of a portion of the coupler of FIGS. 9-14.

Likewise, with reference to FIG. 16, which illustrates the connection associated with the system 100 of FIGS. 9-14, it can be understood that the tapered shape has the advantage of forcing engagement of the lock during advance as a result of the tapered mating faces 124a, 128b. Specifically, the shape imparts a force towards locking when rotated. Likewise, reverse rotation imparts a separating force. Again, the "bottomed out" nature of the engagement between faces 124a, 128a also maximizes the usable area to transmit axial thrust, and also helps to guard against debris and dust entry.

The projection(s) 24/124 and recess(s) 28/128 may be formed directly on the drilling components, instead of on a separate adapter 10. For example, in FIG. 9, it can be appreciated that the adapter 110 may be eliminated, and the drill bit 104 may couple directly with the chuck 102 using the corresponding projections and recesses 124, 128. Other applications are also possible.

This arrangement also allows for the portions 20, 22 to be modified at the connection ends 18 to engage different sizes or types of drill steels. The adapter 10 may thus also be considered in such case to qualify as an adapter for adapting different sizes or shapes of drilling components to connect. Regardless of the particular ends 18 provided, the coupling arrangement would remain reliably established, and easy to separate when desired.

An alternate characterization is as follows. FIGS. 1-16 show an apparatus for forming a quick-release coupling. A first part 20 includes a plurality of first teeth 24, 124 separated by first gaps 28, 128, each first tooth having a first flat face 24a, 124a and a first tapered face 24b, 124b extending in a circumferential direction. A second part 22 includes a plurality of second teeth 24, 124 separated by second gaps 28, 128, each second tooth having a second flat face 24a, 124a and a second tapered face 24b, 124b extending in the circumferential direction. The first teeth 24, 124 fit in the second gaps 28, 128 and the second teeth 24, 124 fit in the first gaps 28, 128 such that the first and second flat faces 24a, 124a and the first and second tapered faces 24b, 124b engage each other to form a releasable locking engagement when the first and second parts 20, 22 are brought into engagement in an axial direction.

Thus, summarizing again, first and second parts (e.g., drilling components 20, 22) have a plurality of interdigitated teeth 24 arranged to as to urge driving faces 24a, 124a, 24b 124b of the teeth of the first component into driven faces 28a, 128a, 28b, 128b of the second component when rotated in a first direction. The teeth are arranged to separate when the first and second components are rotated in a second direction opposite the first direction, and arranged to transmit bi-directional thrust in an axial direction.

Turning now to FIGS. 17-20, a further embodiment of an adapter 200 is shown. In this embodiment, the adapter 200 includes opposing ends 202, 204, which are shown as being generally polygonal in cross-section (hexagonal, in particular) but may have any cross-sectional shape. Each of the ends 202, 204 includes one or more raised projections, which in the illustrated embodiment comprise a plurality of axially spaced, cutters 206. As perhaps best understood from FIG. 18, the cutters 206 may include portions or teeth 206a that are raised relative to the nominal diameter of the adapter 200 (that is, the portions 206a provide the adapter with an outer diameter that is greater than a nominal diameter, such as create by the flats in the hexagonal example), thus forming a "sawtooth" arrangement. However, the overall maximum diameter of the ends 202, 204 remains slightly less than a bore 208 of a corresponding drill steel 210 into which the adapter is inserted, so as to couple two such drill steels together.

In use, each end 202, 204 of the adapter 200 is inserted into the bores 208 of opposing drill steels 210 in order to couple them together. During rotation, such as in the course of forming a borehole, the cutters 206 thus partially cut or score the inner surface of the bore 208 (note score lines or grooves 212 in FIG. 19) in a circumferential direction. These grooves 212 may to engage the projections 206a and thus serve to couple the drill steels 210 together in a secure manner, and one that allows for withdrawal from the borehole without becoming detached and "lost." However, once withdrawal is completed, relative rotation of the adapter 200 and steel(s) 210 in a direction opposite the drilling direction that caused the grooves 212 to be formed may dislodge the projections 206a, thereby allowing for separation of the adapter 200 (typically without requiring tools, or manually) and reuse.

Figure 20A:
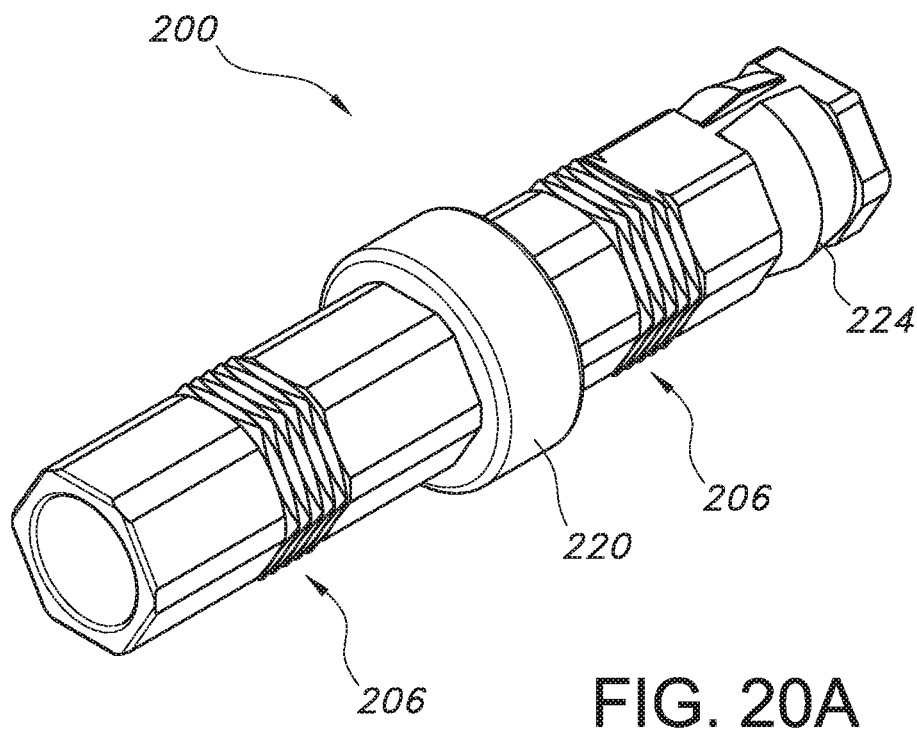
Figure 20B:
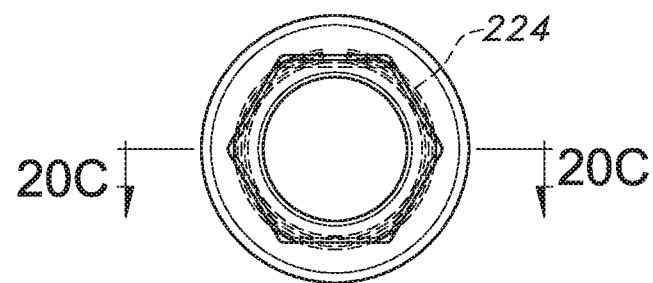
Figures 20C, 20D:
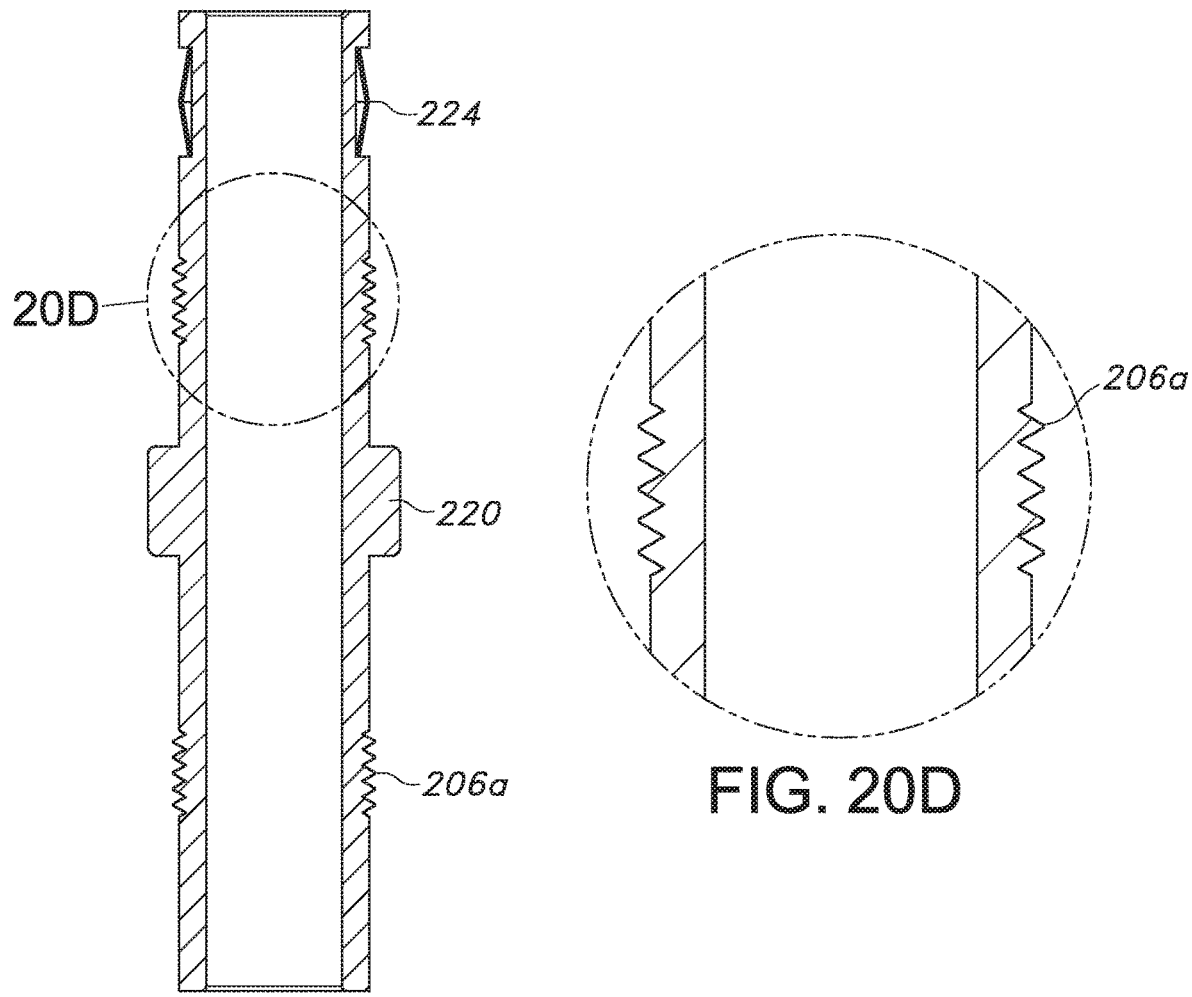

FIGS. 20A, 20B, and 20C illustrate in particular one example of the adapter 200, which includes an oversized intermediate portion 220, as well as a recessed portion 222 (see FIG. 17 also). This recessed portion 222 may receive a bushing 224, which thus helps to form a fluid-tight seal needed for creating an effective vacuum for recovering cutting debris via the associated tubular drill steels (not shown).

FIG. 21 illustrates an alternate embodiment, in which one or both ends 302, 304 of an adapter 300 are tribologically enhanced to form a releasable coupling via high friction engagement. In the illustrated embodiment, the enhancement is achieved by providing one or more pieces of high-friction material, such as elastomeric (e.g., rubber) strips 306, along the adapter end(s) 302, 304, which may be fastened using an adhesive. In the case where the ends 302, 304 are hexagonal, the strips 306 may be provided on the flats, adjacent to the corners. Hence, when inserted into a bore of a drill steel (not shown, but see FIG. 18), the strips 306 create a frictional engagement that aids in retaining the steel and adapter 300 together during withdrawal. As can be appreciated, advantages of this arrangement include: (1) the ability to replace the frictional enhancements (strips 306) one spent or worn; and (2) avoid deforming the interior surface of the drill steel.

FIGS. 22 and 23 illustrate embodiments of adapters 400 for use in connection with drill steels 402 having circular bores 404. The bores 404 may be provided with one or more receivers 406 for engaging a corresponding raised portion of the adapter 400, which may be an elongated strip 408 extending in the axial direction. The strip 408 may be rounded and shallow, as shown in FIG. 28, or raised and having corners and defined faces, as shown in FIG. 29.

FIG. 24 is a further embodiment of an adapter 500 which includes one end 502 with the partial dovetail projections 504 as described above, and a round (circular cross-section) end 506 with knurling, which may be in the form of a plurality of elongated strips 508. The strips 508 may engage corresponding surfaces of a drill steel (not shown) having a rounded inner diameter (not shown), or alternatively corresponding receivers or grooves.

Figure 28:
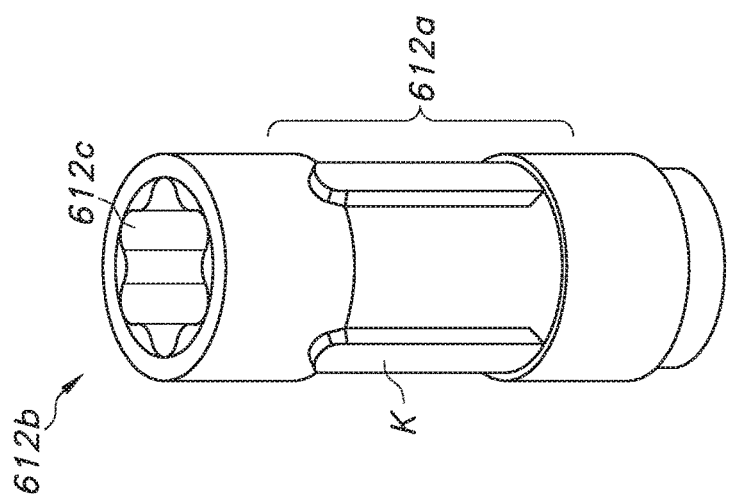
Figure 29C:
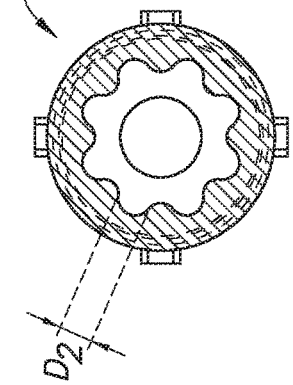
Figure 31:
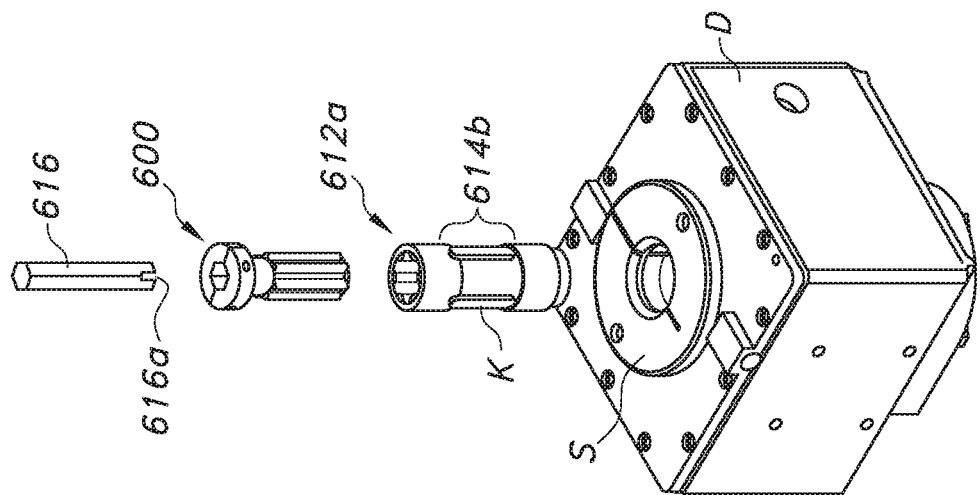
Figure 30:
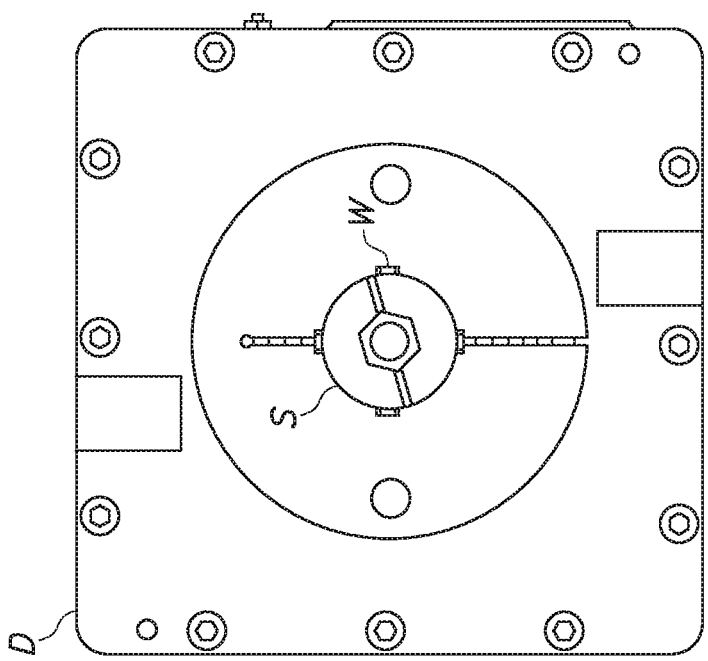

FIGS. 25-31 illustrate a further embodiment of a socket adapter 600 for coupling with a chuck 612 of a drill D (see FIG. 31), which may have a socket S for receiving the chuck 612 and associated keyways W for engaging keys K thereon to create a secure driving engagement. Turning to FIG. 28, it can be understood that the chuck 612 includes a plurality of inwardly directed (or radial) internal projections or lobes 612c. The lobes 612c form alternating grooves for receiving corresponding external projections or lobes 614c on the lower end 614b of the adapter 600, and thus when mated form a secure driving engagement.

As perhaps best understood from FIGS. 26, 27, 28, 29A, 29B, 29C, and 30, the socket adapter 600 may have a petaloid configuration (e.g., having a petaloidal cross-sectional shape, such that a transverse slice of it generally looks like a flower), The adapter 600 may thus be provided with a number of lobes (eight in the illustrated example), such that the adapter 600 is securely, but releasably held in the chuck 612 for purposes of being rotatably driven. While eight lobes is a preferred and important arrangement in one embodiment to increase the surface area of the driving engagement, other embodiments may include more or fewer lobes.

Lower portions L of the lobes 612c are arranged such that the gaps between them and the resulting grooves are enlarged circumferentially relative to the lobes 612c of upper portion U (compare distances $D_1$ and $D_2$). Thus, the lower, male end 614b of the adapter 600 may be fully inserted into the chuck 612 such that the upper edges of the lobes 614c clear the lower edges of the resulting offset lobes 612c along the upper portion U. At this point, the adapter 600 may be rotated or twisted in a clockwise direction to form a locking engagement that can resist movement in the drilling direction (that is, the direction of advance to form a borehole or retreat therefrom). Reversing of the twist (e.g., counterclockwise) thus allows for the adapter 600 to be freely removed.

The upper end portion 614a of the adapter 600 is in turn adapted for securely engaging the drill steel 616. The adapter 600 includes an opening 614d for receiving the lower end of the steel 616, and may be shaped accordingly (typically, a hexagonal configuration, but could also simply be rounded, having a circular cross-section). The adapter 600 may be provided with an internal coupler 620, which at an upper end may comprise the partial dovetail ("wave-shaped") projections or teeth 622.

When a drill steel 616 having corresponding projections or teeth 616a is inserted into the socket adapter 600 and mated with the projections or teeth 622, a selective locking engagement may be established, especially during relative rotation and even while the steel 616 is withdrawn from the borehole. Relative rotation in the opposite direction releases the connection, and allows the steel 616 to be withdrawn from the socket adapter 600.

Although the invention has been illustratively described and presented by way of specific exemplary embodiments, and examples thereof, it is evident that many alternatives, modifications, or/and variations, thereof, will be apparent to those skilled in the art. For example, while use in connection with a rotary drill is contemplated, use of the adapter could also be made with a percussive drill, or a combined rotary and percussive drill. Accordingly, it is intended that all such alternatives, modifications, or/and variations, fall within the spirit of, and are encompassed by, the broad scope of the appended claims.

Each of the following terms written in singular grammatical form: "a", "an", and "the", as used herein, means "at least one", or "one or more". Use of the phrase "one or more" herein does not alter this intended meaning of "a", "an", or "the". Accordingly, the terms "a", "an", and "the", as used herein, may also refer to, and encompass, a plurality of the stated entity or object, unless otherwise specifically defined or stated herein, or, unless the context clearly dictates otherwise. For example, the phrases: "a unit", "a device", "an assembly", "a mechanism", "a component, "an element", and "a step or procedure", as used herein, may also refer to, and encompass, a plurality of units, a plurality of devices, a plurality of assemblies, a plurality of mechanisms, a plurality of components, a plurality of elements, and, a plurality of steps or procedures, respectively.

Each of the following terms: "includes", "including", "has", "having", "comprises", and "comprising", and, their linguistic/grammatical variants, derivatives, or/and conjugates, as used herein, means "including, but not limited to", and is to be taken as specifying the stated components), feature(s), characteristic(s), parameter(s), integer(s), or step(s), and does not preclude addition of one or more additional components), feature(s), characteristic(s), parameter(s), integer(s), step(s), or groups thereof. Each of these terms is considered equivalent in meaning to the phrase "consisting essentially of." Each of the phrases "consisting of and "consists of," as used herein, means "including and limited to."

The phrase "consisting essentially of," as used herein, means that the stated entity or item (system, system unit, system sub-unit device, assembly, sub-assembly, mechanism, structure, component element or, peripheral equipment utility, accessory, or material, method or process, step or procedure, sub-step or sub-procedure), which is an entirety or part of an exemplary embodiment of the disclosed invention, or/and which is used for implementing an exemplary embodiment of the disclosed invention, may include at least one additional feature or characteristic" being a system unit system sub-unit device, assembly, sub-assembly, mechanism, structure, component or element or, peripheral equipment utility, accessory, or material, step or procedure, sub-step or sub-procedure), but only if each such additional feature or characteristic" does not materially alter the basic novel and inventive characteristics or special technical features, of the claimed item.

The term "method", as used herein, refers to steps, procedures, manners, means, or/and techniques, for accomplishing a given task including, but not limited to, those steps, procedures, manners, means, or/and techniques, either known to, or readily developed from known steps, procedures, manners, means, or/and techniques, by practitioners in the relevant field(s) of the disclosed invention.

Throughout this disclosure, a numerical value of a parameter, feature, characteristic, object or dimension, may be stated or described in terms of a numerical range format. Such a numerical range format, as used herein, illustrates implementation of some exemplary embodiments of the invention, and does not inflexibly limit the scope of the exemplary embodiments of the invention. Accordingly, a stated or described numerical range also refers to, and encompasses, all possible sub-ranges and individual numerical values (where a numerical value may be expressed as a whole, integral, or fractional number) within that stated or described numerical range. For example, a stated or described numerical range "from 1 to 6" also refers to, and encompasses, all possible sub-ranges, such as "from 1 to 3", "from 1 to 4", "from 1 to 5", "from 2 to 4", "from 2 to 6", "from 3 to 6", etc., and individual numerical values, such as "1.3", "2", "2.8", "3", "3.5", "4", "4.6", "5", "5.2", and "6", within the stated or described numerical range of from 1 to 6". This applies regardless of the numerical breadth, extent or size, of the stated numerical range.

Moreover, for stating or describing a numerical range, the phrase "in a range of between about a first numerical value and about a second numerical value", is considered equivalent to, and meaning the same as, the phrase "in a range of from about a first numerical value to about a second numerical value", and, thus, the two equivalents meaning phrases may be used interchangeably. For example, for stating or describing the numerical range of room temperature, the phrase "room temperature refers to a temperature in a range of between about 20° C. and about 25° C., and is considered equivalent to, and meaning the same as, the phrase "room temperature refers to a temperature in a range of from about 20° C. to about 25° C.

Terms of approximation, such as the terms about, substantially, approximately, etc., as used herein, refers to ±10% of the stated numerical value. "Generally polygonal" means that the shape has flat surfaces, as with a polygon, but may have rounded corners connecting these surfaces.

The phrase "operatively connected," as used herein, equivalently refers to the corresponding synonymous phrases "operatively joined", and "operatively attached," where the operative connection, operative joint or operative attachment, is according to a physical, or/and electrical, or/and electronic, or/and mechanical, or/and electro-mechanical, manner or nature, involving various types and kinds of hardware or/and software equipment and components.

It is to be fully understood that certain aspects, characteristics, and features, of the invention, which are, for clarity, illustratively described and presented in the context or format of a plurality of separate embodiments, may also be illustratively described and presented in any suitable combination or sub-combination in the context or format of a single embodiment. Conversely, various aspects, characteristics, and features, of the invention which are illustratively described and presented in combination or sub-combination in the context or format of a single embodiment may also be illustratively described and presented in the context or format of a plurality of separate embodiments.

The invention claimed is:

1. An apparatus for forming a releasable connection, comprising: a first part adapted for coupling with a second part by a quick-release coupling formed by a projection of the first part having an at least partial dovetail shape and a recess of the second part having an at least partial dovetail shape; wherein an opening in the recess is adapted for receiving the projection in an axial direction, wherein the first part includes a tubular end portion having a recess and the second part is adapted to nest at least partially within the recess of the tubular end portion of the first part, wherein one of the first part and the second part comprises a drill bit and the other of the first part and the second part comprises a carrier for the drill bit.

2. The apparatus of claim 1, wherein the projection comprises a full dovetail shape.

3. The apparatus of claim 1, wherein the recess comprises a full dovetail shape.

4. The apparatus of claim 1, wherein the first part includes two or more projections and the second part includes two or more corresponding recesses.

5. The apparatus of claim 1, wherein the carrier comprises a chuck adapted for fitting into a socket of a drill head.

6. The apparatus of claim 1, wherein the first part or second part comprises a plurality of external projections, and further including a chuck having a plurality of internal projections alternating in position with the external projections to form a selective locking engagement.

7. The apparatus of claim 6, wherein the plurality of external projections are petaloidal.

8. The apparatus of claim 6, wherein the plurality of internal projections comprise a first set of projections having a first circumferential dimension and a second set of projections having a second circumferential dimension greater than the first circumferential dimension, whereby the plurality of external projections on the first part or second part may pass through the first set of projections and move within the second set of projections when the first part or second part is twisted within the chuck to form a secure locking engagement.

9. The apparatus of claim 1, wherein the first part or the second part comprises a peripheral seal.

10. The apparatus of claim 1, wherein the recess is formed in a sidewall of a generally cylindrical tubular portion of the second part having an end wall.

11. A drilling system, comprising:
a chuck including at least one first projection or first recess having an at least partial dovetail shape;
a carrier including at least one second projection or second recess having an at least partial dovetail shape for mating with the first projection or first recess of the chuck forming a first quick-release coupling, and at least one third projection or third recess having an at least partial dovetail shape; and
a drill bit including at least one fourth projection or fourth recess having an at least partial dovetail shape for mating forming a second quick-release coupling with the at least one third projection or third recess of the carrier.

12. The drilling system of claim 11, wherein the carrier comprises a first connector including the at least one second projection or second recess for mating with the first projection or first recess of the chuck, a second connector including the at least one third projection or third recess, and an intermediate connector for connecting the first and second connectors.

13. The drilling system of claim 11, wherein each of the chuck, carrier, and drill projection bit includes a passage for allowing fluid flow.

14. The apparatus of claim 1, An apparatus for forming a releasable connection, comprising: a first part adapted for coupling with a second part by a quick-release coupling formed by a projection of the first part having an at least partial dovetail shape and a recess of the second part having an at least partial dovetail shape, wherein an opening in the recess is adapted for receiving the projection in an axial direction, wherein the projection is raised in a transverse direction above a nominal outer diameter of a generally cylindrical shaft forming the first part adapted to fit within a passage of the second part, wherein one of the first part and the second part comprises a drill bit and the other of the first part and the second part comprises a carrier for the drill bit.

\* \* \* \* \*

UNITED STATES PATENT AND TRADEMARK OFFICE
CERTIFICATE OF CORRECTION

PATENT NO.           : 11,213,900 B2
APPLICATION NO.      : 16/636045
DATED                : January 4, 2022
INVENTOR(S)          : Timothy D. Burgess et al.

Page 1 of 1

It is certified that error appears in the above-identified patent and that said Letters Patent is hereby corrected as shown below:

In the Claims

Column 14, Claim 14, Line 32 – please remove --- The apparatus of claim 1, ---

Signed and Sealed this
Twelfth Day of April, 2022

Drew Hirshfeld
*Performing the Functions and Duties of the*
*Under Secretary of Commerce for Intellectual Property and*
*Director of the United States Patent and Trademark Office*